United States Patent

Nomura et al.

[11] Patent Number: 6,069,747
[45] Date of Patent: May 30, 2000

[54] CAM MECHANISM

[75] Inventors: Masaaki Nomura, Asaka; Yasuo Ueno; Toyomichi Nakamura, both of Tokyo, all of Japan

[73] Assignee: Fuji Photo Film Co., Ltd., Kanagawa, Japan

[21] Appl. No.: 09/016,637

[22] Filed: Jan. 30, 1998

[30] Foreign Application Priority Data

| Jan. 30, 1997 | [JP] | Japan | 9-016414 |
| Jan. 30, 1997 | [JP] | Japan | 9-016415 |
| Jan. 30, 1997 | [JP] | Japan | 9-016416 |
| Jan. 30, 1997 | [JP] | Japan | 9-016417 |

[51] Int. Cl.$^7$ .................................................. G02B 15/14
[52] U.S. Cl. ........................... 359/699; 359/694; 359/696
[58] Field of Search .................................... 359/694, 697, 359/699, 700, 813, 198, 696; 346/145; 347/232, 248, 263

[56] References Cited

U.S. PATENT DOCUMENTS

| 3,549,250 | 12/1970 | Pantenburg | 359/694 |
| 4,235,509 | 11/1980 | Takabayashi | 359/696 |
| 4,868,586 | 9/1989 | Norris | 346/145 |
| 5,115,348 | 5/1992 | Notagashira | 359/697 |
| 5,196,963 | 3/1993 | Sato et al. | 359/700 |
| 5,631,776 | 5/1997 | Weigand et al. | 359/694 |
| 5,748,391 | 5/1998 | Tanaka et al. | 359/813 |

*Primary Examiner*—Loha Ben
*Attorney, Agent, or Firm*—Young & Thompson

[57] ABSTRACT

A cam mechanism according to the present invention is constructed in such a way that a face cam is secured to a rotary shaft which is rotated by a motor, and a pressing cam, which is movable along the rotary shaft, presses a cam follower pin toward a cam face of the face cam. The press cam has a cam face which faces the cam face of the face cam and has the same cam curve as that of the face cam. Hence, when the motor rotates, the swing pin follows the cam face of the face cam, and the press cam presses the swing pin with a substantially constant force while remains stationary at substantially the same position. Thus, it is possible to reduce a contact friction on the cam face and a load torque which is generated when the motor is driven, and it is also possible to eliminate the unevenness of the torque, which results from the movement of the cam follower which moves up and down on the cam face.

4 Claims, 18 Drawing Sheets

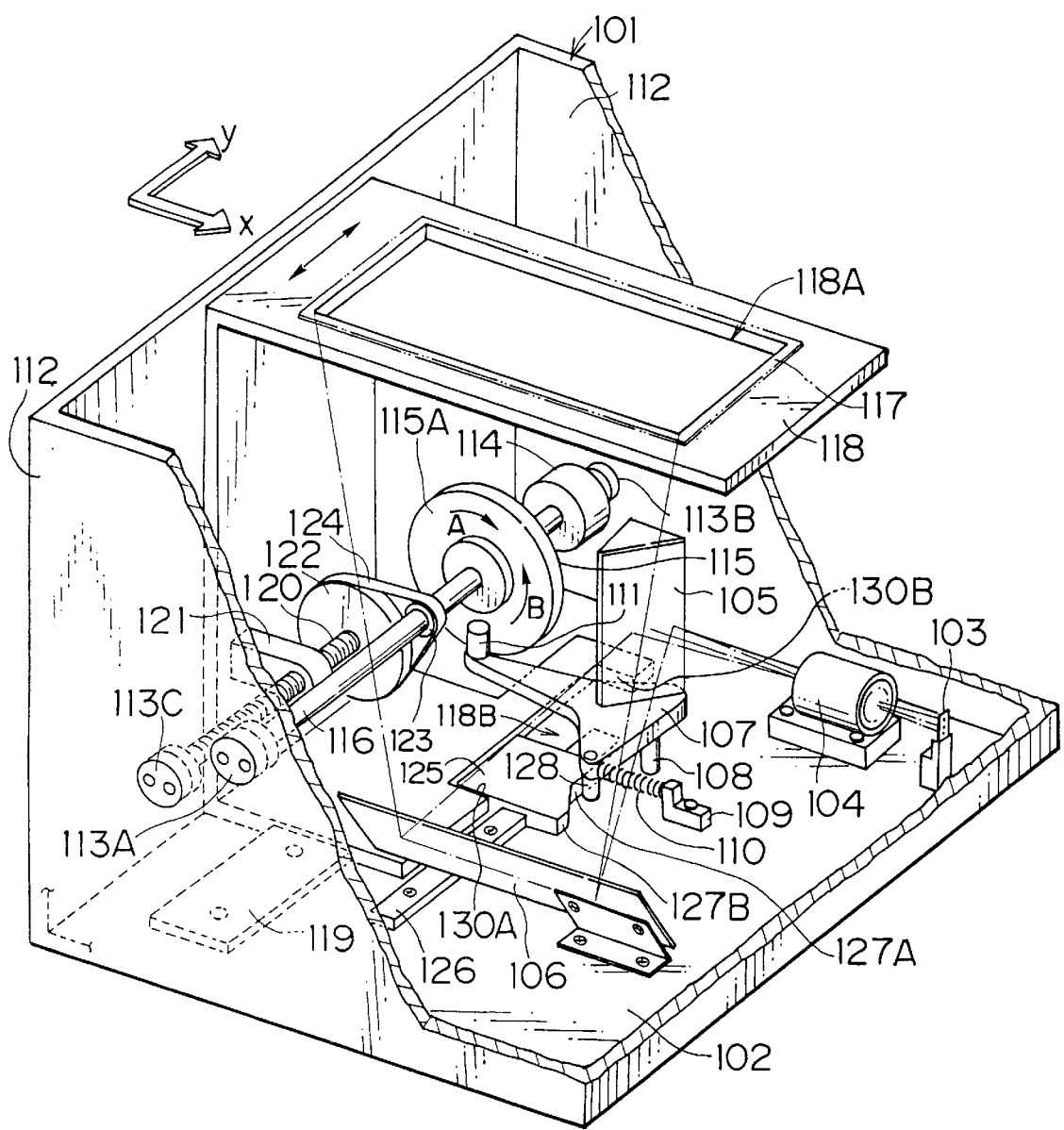
F I G. 7

F I G. 8
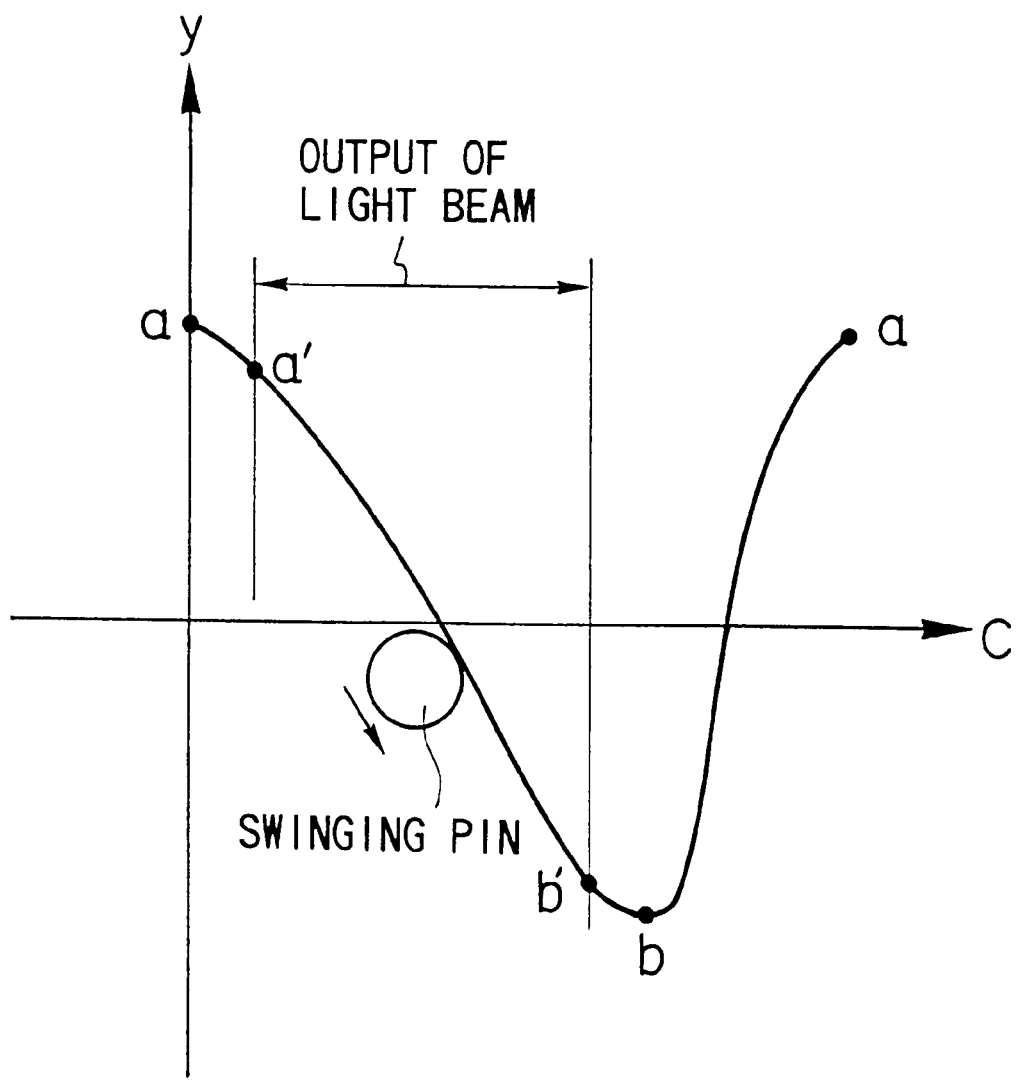

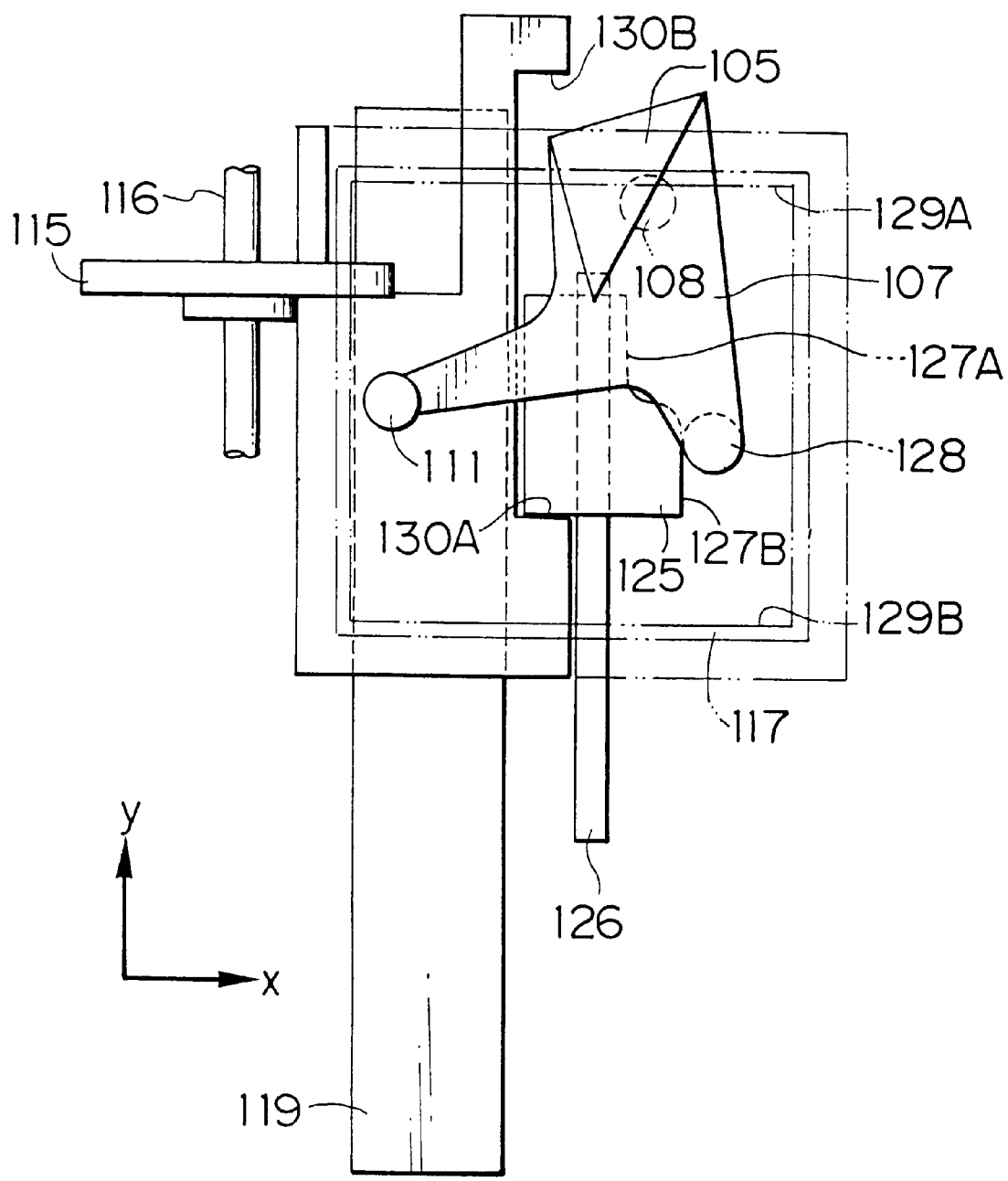
F I G. 1 1

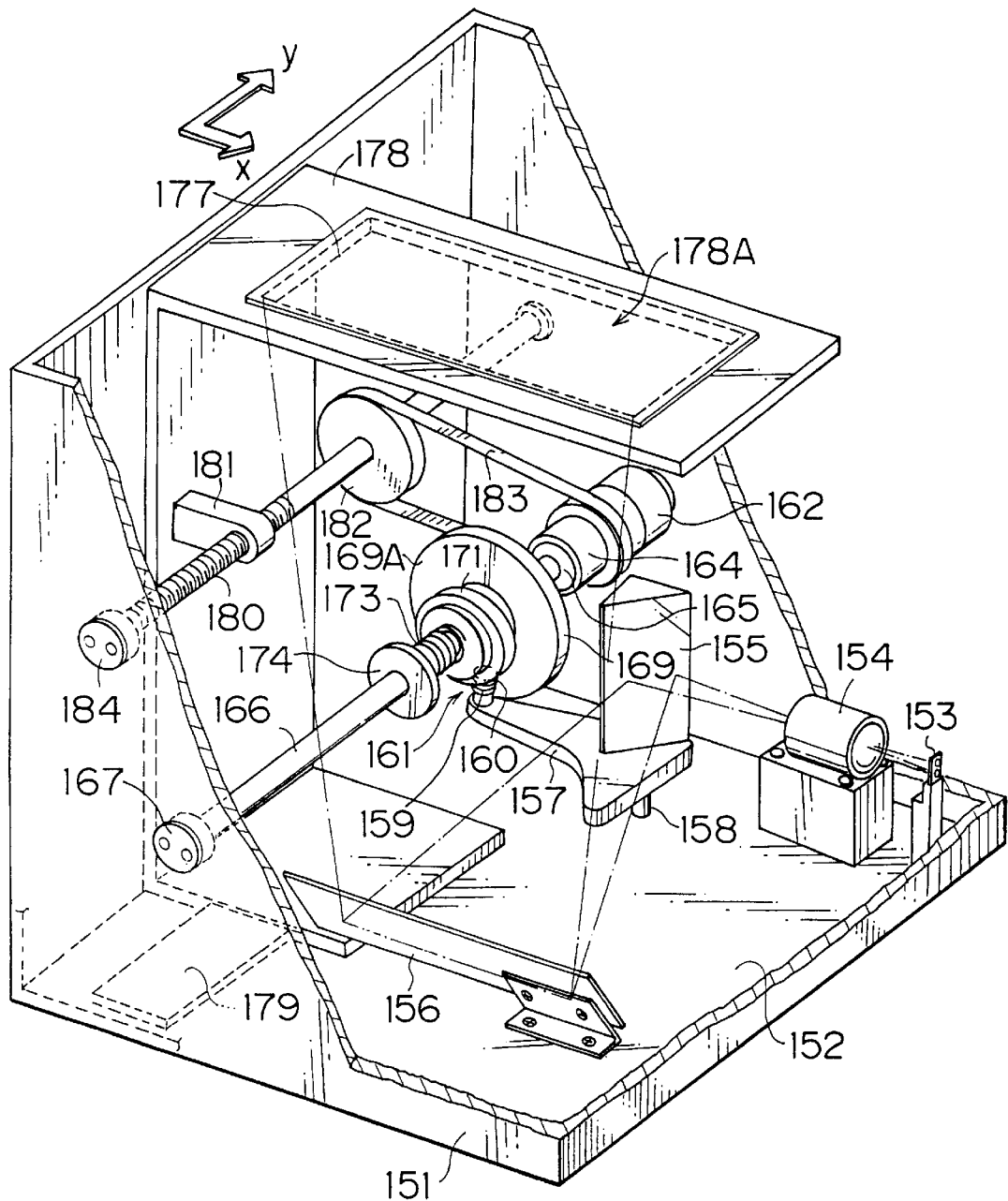
F I G. 1 3

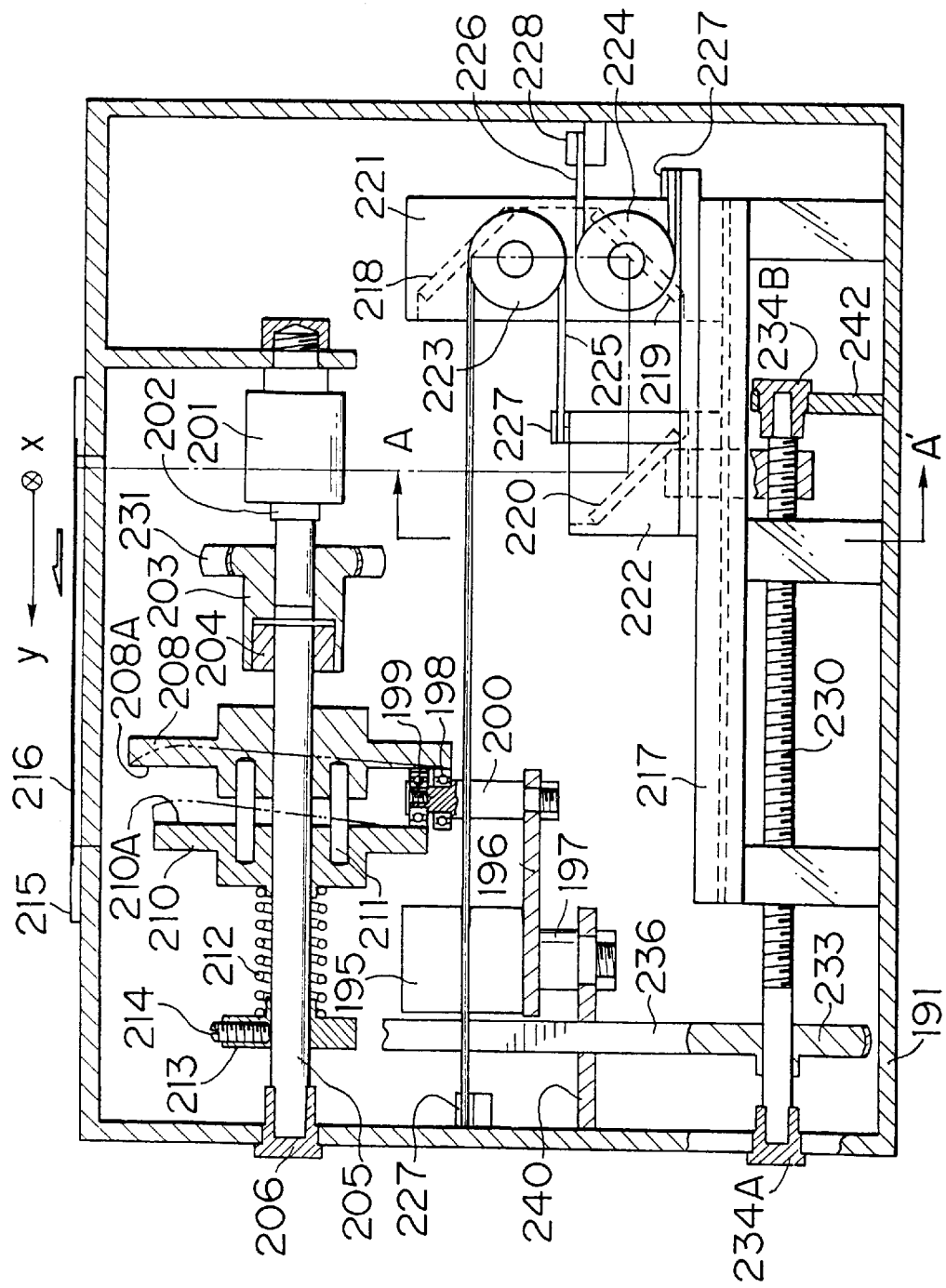
F I G. 16

FIG. 19
PRIOR ART
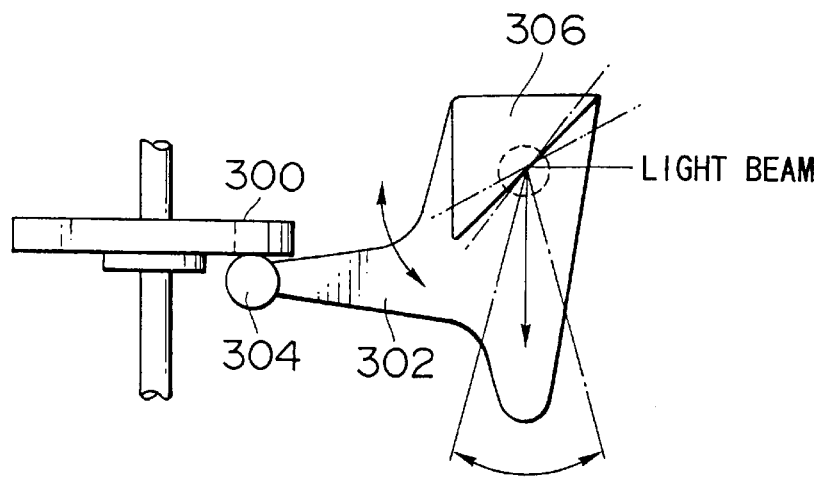
FIG. 20(A)
PRIOR ART
FIG. 20(B)
PRIOR ART
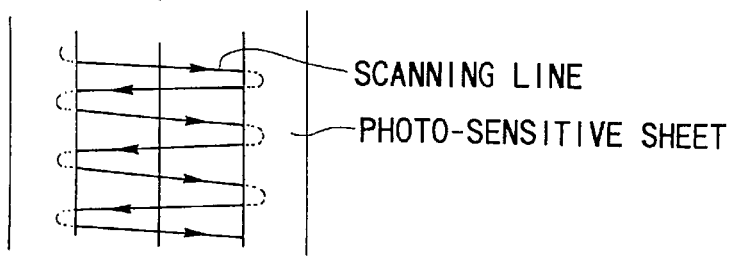

CAM MECHANISM

BACKGROUND OF THE INVENTION

1. Field of the Invention

The present invention relates generally to a printer, and more particularly to a printer which makes a print by scanning a sheet of photo-sensitive material with a beam of light emitted from a light source of light emitting diodes, or the like.

2. Description of Related Art

There is a conventional printer which makes a print by scanning a sheet on which a photo-sensitive material is applied (hereinafter referred to as a photo-sensitive sheet) with a beam of light emitted from a light source of light emitting diodes (LED), or the like. In the conventional printer, for main scanning, a light beam from the LED light source is deflected by a scanning mirror which is oscillated by a cam mechanism so that the light beam can traverse the photo-sensitive sheet in the form of a line of light (hereinafter referred to as a line beam) in a main scanning direction. For sub-scanning, a unit (a stage) on which the photo-sensitive sheet is set (hereinafter referred to as a sub-scanning unit) is horizontally moved in a sub-scanning direction which is perpendicular to the main scanning direction so that the photo-sensitive sheet can be scanned with the line beam from the LED light source in the sub-scanning direction. Thus, the photo-sensitive sheet can be scanned with the light beam from the LED light source in both the main scanning direction and the sub-scanning direction, and thereby an image is printed on the photo-sensitive sheet.

In the conventional printer, a face cam is used in the cam mechanism for oscillating the scanning mirror, and a cam follower is pressed against a cam face of the face cam by a biasing spring, so that the cam follower can follow the cam face of the face cam, which is rotated by a motor. This cam mechanism, however, has a problem in that a contact friction between the face cam and the cam follower and a load torque of the drive motor are great. Moreover, the load torque fluctuates according to the movement of the cam follower which moves up and down on the cam face of the face cam, and the fluctuation of the load torque has bad effects on the print. If the conventional printer using the cam mechanism makes a print at higher speed, the force of the biasing spring to press the cam follower must be increased in proportion to the square of the rate of revolution of the face cam, and the driving force of the diving motor must be increased in proportion to the cube of the rate of revolution of the face cam.

In the conventional printer, the scanning mirror is oscillated by the cam mechanism shown in FIG. 19, and a light beam in the form of a line in the main scanning direction is generated. As shown in FIG. 19, a swing pin 304 is attached to the end of a swing lever 302, and the swing pin 304 is biased against a face cam 300, which is rotated by a motor (not shown), by a biasing spring (not shown). A scanning mirror 306 is fixed to the swing lever 302. A light beam enters from the right side in FIG. 19, and is reflected downward by the scanning mirror 306. When the motor rotates the face cam 300, the swing lever 302 swings up and down, and the light beam changes its reflecting directions to the right and left to thereby generate a line beam.

In the conventional printer, the line beam in the main scanning direction falls on the photo-sensitive material while the sub-scanning unit, on which the photo-sensitive material is set, is moving in the sub-scanning direction as described above. Thus, the line beam which is reflected by the mirror 306 as shown in FIG. 20(A) describes forward (left to right) scanning lines and backward (right to left) scanning lines on the photo-sensitive sheet as shown in FIG. 20(B), and both scanning lines are inclined because the photo-sensitive sheet moves (upward in the drawing). For this reason, the forward and backward scanning lines cannot be parallel to one another, and the resolution of the print can be deteriorated. Hence, the conventional printer makes a print using only the forward scanning lines, and then the number of scanning lines is reduced by half. In this case, the quality of the print is lowered, and the quantity of light is poor. To solve these problems, there is a printer which uses a fast-forwarding mechanism to oscillate the scanning mirror, but there is a disadvantage that the printer shakes and makes noise.

In the conventional printer, if one motor drives the cam mechanism which oscillates the scanning mirror and the sub-scanning unit on which the photo-sensitive material is set, the cam mechanism oscillates the scanning mirror when the sub-scanning unit returns to the start printing position at a high speed after moving to make a print (for example, because the swing pin, which swings the scanning mirror, abuts on a cam member such as the face cam). Thus, a large load is applied to the motor, and the cam mechanism makes loud noise while rotating at a high speed.

SUMMARY OF THE INVENTION

The present invention has been developed in view of the above-described circumstances, and has as its object the provision of a printer which reduces the contact friction between the cam face of the face cam and the cam follower and the load torque which is generated when the motor is driven, and eliminates the unevenness of the load torque resulting from the movement of the cam follower which moves up and down on the cam face.

It is another object to make both forward and backward scanning lines of the line beam be parallel on the photo-sensitive material to thereby make a print of high resolution.

It is another object to reduce the load torque and the shock noise made by the cam mechanism, which oscillates the mirror for scanning the light beam in the main scanning direction, when the sub-scanning unit returns to the original position after printing.

To achieve the above-mentioned object, a cam mechanism of the present invention comprises: a face cam which is secured to a rotary shaft and rotates with the rotary shaft; a press cam which is mounted on the rotary shaft movably in an axial direction of the rotary shaft and rotates with the rotary shaft, the press cam being provided with a cam face which faces a cam face of the face cam, a cam profile on the cam face of the press cam matching a cam profile on the cam face of the face cam; a pressing means for pressing the press cam toward the face cam; and a cam following section provided with a cam follower which is pinched between the cam faces of the face cam and the press cam, the cam following section being moved back and forth by rotation of the rotary shaft.

According to the present invention, the cam follower is pinched between the cam face of the face cam and the cam face of the press cam, which faces the cam face of the face cam and has the cam profile matching that of the cam face of the face cam. The pressing means presses the press cam toward the face cam. When the face cam and the press cam are rotating, the force of the press cam which presses the cam follower toward the face cam can be substantially constant and small. The contact friction between the cam face of the face cam and the cam follower and the load torque of the motor can be small, and it is possible to eliminate the unevenness of the torque resulting from the movement of the cam follower which moves up and down on the cam face.

To achieve the above-mentioned object, a printer of the present invention for printing an image on a photo-sensitive material is characterized in that a motor drives a cam mechanism to oscillate a mirror for scanning a light beam in a main scanning direction, the motor moves the photo-sensitive material and the light beam relatively to one another in a sub-scanning direction, the cam mechanism comprises: a face cam which is secured to a rotary shaft and rotates with the rotary shaft which is rotated by the motor; a press cam which is mounted on the rotary shaft movably in an axial direction of the rotary shaft and rotates with the rotary shaft, the press cam being provided with a cam face which faces a cam face of the face cam, a cam profile on the cam face of the press cam matching a cam profile on the cam face of the face cam; a pressing means for pressing the press cam toward the face cam; and a cam following section provided with a cam follower which is pinched between the cam faces of the face cam and the press cam, the cam following section being moved back and forth by rotation of the rotary shaft to thereby oscillate the mirror.

According to the present invention, the cam mechanism is adopted in the printer as a mechanism which oscillates the mirror for scanning the light beam in the main scanning direction. Thus, as stated above, the contact friction between the cam face of the face cam and the cam follower and the load torque of the motor can be small, and it is possible to eliminate the unevenness of the torque resulting from the movement of the cam follower which moves up and down on the cam face.

To achieve the above-mentioned object, a printer of the present invention for printing an image on a photo-sensitive material is characterized in that a mirror swinging mechanism swings a mirror to scan a light beam back and forth in a main scanning direction, and the photo-sensitive material and the light beam move relatively to one another in a sub-scanning direction to scan the light beam in the sub-scanning direction, the mirror swinging mechanism comprises: a motor; a swinging mechanism which is driven by the motor and swings the mirror so that the light beam can scan in the main scanning direction; and a tilting mechanism which is driven by the motor and tilts the mirror so that back and forth scanning lines of the light beam on the photo-sensitive material can be parallel.

According to the present invention, the swinging mechanism swings the mirror to scan the light beam in the main scanning direction, and the tilting mechanism tilts the mirror so that the forward and backward main scanning lines of the light beam can be parallel on the photo-sensitive material. Thereby, it is possible to make a print of high resolution.

To achieve the above-mentioned object, a printer of the present invention for printing an image on a photo-sensitive material is characterized in that a motor rotates a cam member, a cam follower which elastically abuts on a cam face of the cam member swings a mirror to scan a light beam in a main scanning direction, the motor drives a sub-scanning unit for scanning the light beam in a sub-scanning direction by moving the photo-sensitive material and means for making the light beam go onto the photo-sensitive material relatively to one another, the printer comprises: a mirror swinging restriction mechanism which uses a moving mechanism of the sub-scanning unit to separate the cam follower from the cam face of the cam member while the sub-scanning unit returns to a start sub-scanning position or a position in vicinity of the start sub-scanning position after the sub-scanning unit moves to a complete sub-scanning position to make a print.

For example, in the printer, the mirror swinging restriction mechanism comprises: a restriction member which is movable between a first position for enabling the cam follower to abut on the cam face of the cam member and a second position for separating the cam follower from the cam face of the cam member; a first member provided in the sub-scanning unit and moving the restriction member from the first position to the second position by movement of the sub-scanning unit past the complete sub-scanning position; and a second member provided in the sub-scanning unit and moving the restriction member from the second position to the first position by return-movement of the sub-scanning unit when the sub-scanning unit reaches vicinity of the start sub-scanning position.

According to the present invention, while the sub-scanning unit returns to the start sub-scanning position after printing, the cam follower is separated from the cam face of the cam mechanism for swinging the mirror. Thus, noise and the load of the driving motor are reduced.

To achieve the above-mentioned object, a printer of the present invention for printing an image on a photo-sensitive material is characterized in that a motor rotates a cam member provided on a first rotary shaft to swing a mirror for scanning a light beam in a main scanning direction, the motor rotates a second rotary shaft provided with a lead screw to drive a sub-scanning unit for scanning the light beam in a sub-scanning direction by moving the photo-sensitive material and means for making the light beam go onto the photo-sensitive material relatively to one another, the printer comprises: a unidirectional clutch in a power transmission system which transmits a rotational driving force of the motor to the first rotary shaft, and wherein the unidirectional clutch does not transmit the rotational driving force of the motor to the first rotary shaft if the motor is rotating in a direction to return the sub-scanning unit to a start sub-scanning position.

According to the present invention, if the motor is rotating in such a direction as to make a print, the unidirectional clutch transmits the rotational driving force of the motor to the first rotary shaft and rotates the cam member to swing the mirror so that the light beam can scan in the main scanning direction. If the motor is rotating in such a direction as to return the sub-scanning unit to the start sub-scanning position after printing, the rotational driving force of the motor is not transmitted to the first rotary shaft to prohibit the cam member from rotating. Thus, when the photo-sensitive material or the means which makes the light beam go onto the photo-sensitive material is returned to the start sub-scanning position after printing, it is possible to prevent the cam member from making a shock noise and avoid the contact friction, and the load torque of the motor can be reduced.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 7 is a perspective view illustrating the construction of a printer according to the third embodiment of the present invention;

FIG. 8 is a view illustrating the shape of a cam face of a face cam;

FIG. 11 is a plan view illustrating a state of the sub-scanning unit, the restriction piece and the swing lever;

FIG. 13 is a perspective view illustrating the construction of a printer according to the fourth embodiment of the present invention;

FIG. 16 is a side sectional view illustrating a printer according to the fifth embodiment of the present invention;

FIG. 19 is a view illustrating the truck of a light beam which is scanned by a scanning mirror in a conventional printer; and FIGS. 20(A) and 20(B) are views illustrating the track of the light beam on a photo-sensitive material in the conventional printer.

DETAILED DESCRIPTION OF THE PREFERRED EMBODIMENTS

This invention will be described in further detail by way of example with reference to the accompanying drawings.

Figure 1:
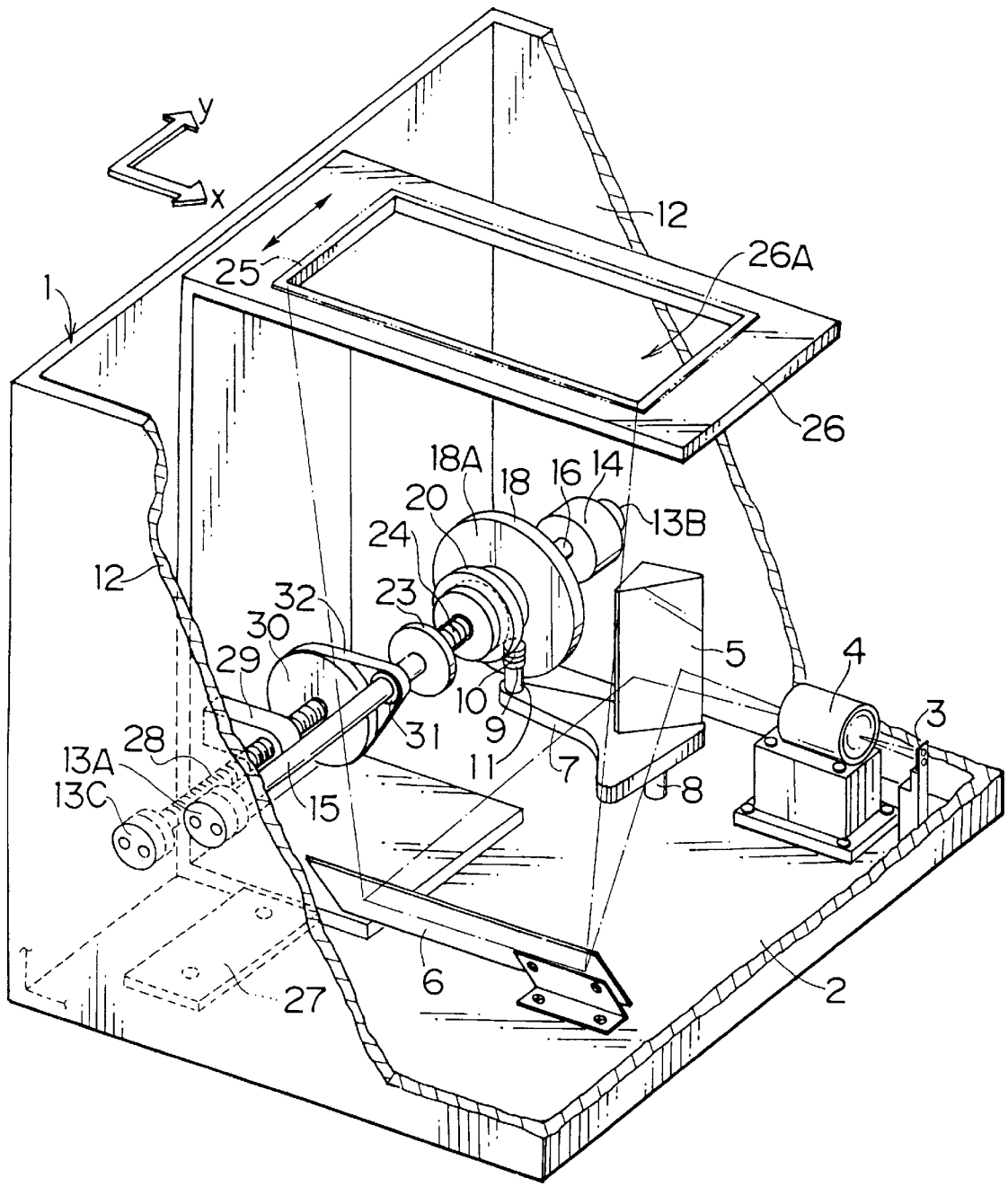
FIG. 1 is a perspective view illustrating the construction of a printer according to the first embodiment of the present invention.

FIG. 1 is a perspective view illustrating the construction of a printer according to the first embodiment of the present invention. The printer is provided with a main scanning mechanism which generates a line beam by swinging a beam of light in a main scanning direction (the direction of x in FIG. 1), and a sub-scanning mechanism which moves a photo-sensitive sheet 25 which is placed on a sub-scanning unit 26 so that the photo-sensitive sheet 25 can be sequentially scanned with the line beam in a sub-scanning direction (the direction of y in FIG. 1).

An explanation will be given of the main scanning mechanism. As shown in FIG. 1, an LED light source 3, a light converging lens 4, a scanning mirror 5, a stationary mirror 6, are arranged on a bottom wall 2 of a housing 1.

The LED light source 3 is composed of three LEDs for example, and the LEDs respectively output light of three wavelengths according to the wavelengths of colors to be generated on the photo-sensitive sheet 25. The intensity of the light of each LED is modulated in accordance with a printed image. The light converging lens 4 converges LED light which is emitted from the LED light source 3 into a light beam which is focused on the photo-sensitive sheet 25, and the LED light falls on a reflective face of the scanning mirror 5.

The scanning mirror 5 is mounted on a swing lever 7, which is rotatably supported by a support 8 at the bottom wall 2 of the housing 1. A swing pin (a cam follower) 11 is provided at the end of the swing lever 7, and the swing pin 11 is pinched between a face cam 18 and a press cam 20 which will be described later.

The face cam 18 is attached to a rotary shaft 15, which is rotatably supported by a bearing 13A which is fixed to a side wall 12 of the housing 1. The rotary shaft 15 connects to an output shaft 16 of a motor 14. The motor 14 is mounted on a bearing 13B which is fixed to the wall 12.

Figure 2:
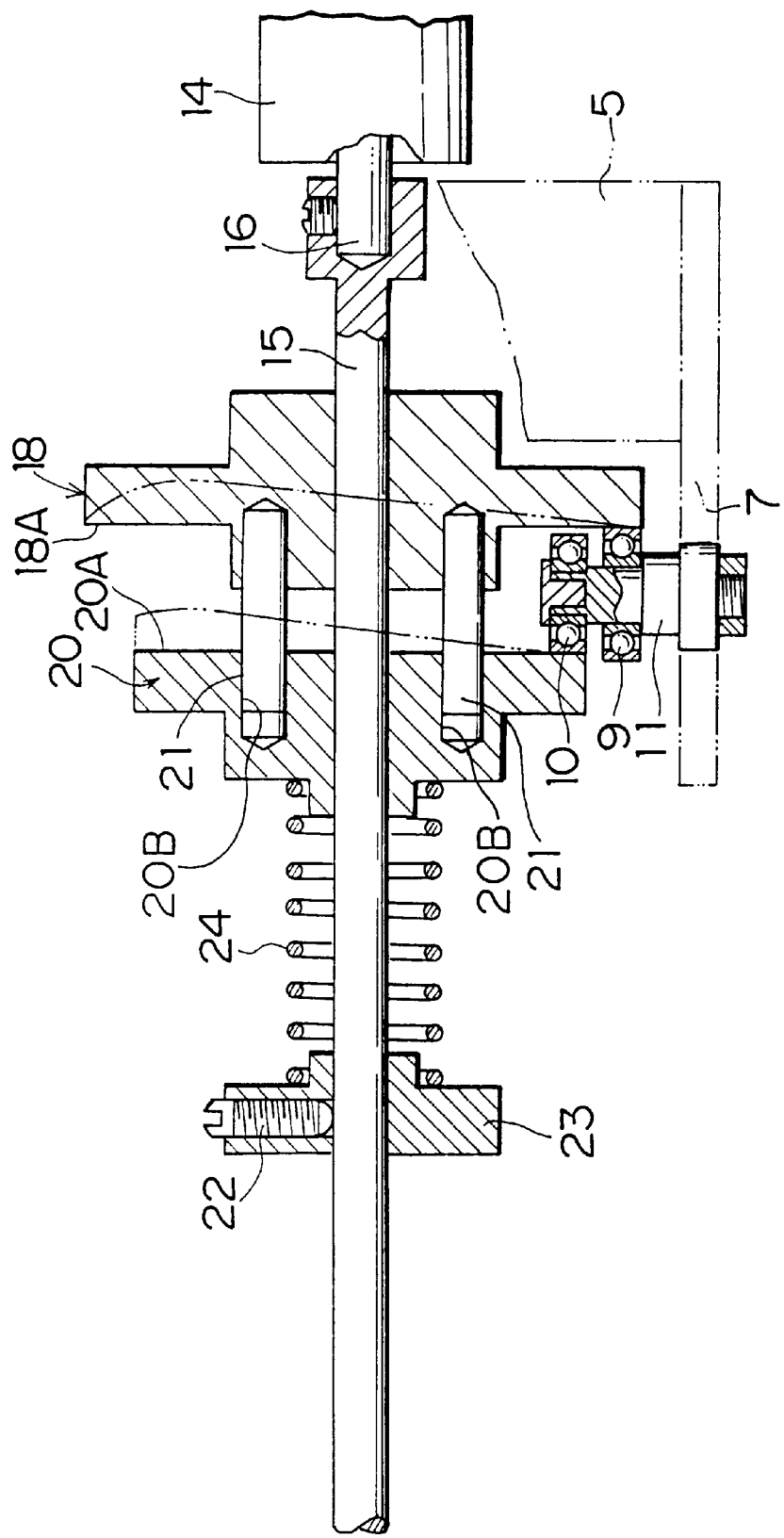
FIG. 2 is a sectional view illustrating a cam mechanism according to the present invention.

As shown in FIG. 2, the press cam 20 is mounted to the rotary shaft 15 adjacent to the face cam 18 in a manner that the press cam 20 is movable forward and backward along the rotary shaft 15 and is rotatable. Pin holes 20B are provided on a cam face 20A of the press cam 20 facing the face cam 18. Pins 21 are secured to the face cam 18, and are inserted into the pin holes 20B in a manner that the pins 21 can slide in and out. Thereby, the press cam 20 can rotate with the face cam 18. One end of a spring 24 is secured to a spring holding member 23, and the other end thereof is secured to the press cam 20. The spring 24 presses the press cam 20 toward the face cam 18. The spring holding member 23 is fixed at a desired position on the rotary shaft 15 with a setting screw 22.

On the other hand, ball bearings 9, 10, which differ in diameter, are mounted at the end of the swing pin 11, which is provided at the end of the swing lever 7. The periphery of the ball bearing 9 is in contact with only a cam face 18A of the face cam 18, and the periphery of the ball bearing 10 is in contact with only the cam face 20A of the press cam 20.

Hence, the press cam 20 presses the swing pin 11 toward the face cam 18 with a force of the spring 24 via the ball bearing 10, and thereby the ball bearing 9 is pressed against the cam face 18A of the face cam 18. Thus, the swing pin 11 is pinched between the face cam 18 and the press cam 20 via the ball bearings 9, 10, and the swing pin 11 can follow the cam profile on the cam face 18A of the face cam 18.

The cam face 20A of the press cam 20, which faces the cam face 18A of the face cam 18, has a cam profile which matches that of the cam face 18A of the face cam 18 so that the distance between the cam face 20A of the press cam 20 and the cam face 18A of the face cam 18 is constant. That is, the cam curves of the cam faces 18A and 20A are the same, and the cam face 20A is formed parallel to the cam face 18A. Hence, while the rotary shaft 15 is rotating, the press cam 20 hardly moves in the axial direction, and the force of the spring 24 can be constant. Thus, the constant force of the swing pin 11 is applied to the face cam 18, and the force of the spring 24 can be reduced. Then, the torque of the motor 14 can be small, and the motor 14 can be compact as a result.

As stated above, the scanning mirror 5 is oscillated by the cam mechanism which consists of the face cam 18, the press cam 20 and the swing pin 11. Thus, the light beam which is emitted from the LED light source 3 and enters the scanning mirror 5 through the light converging lens 4, enters the stationary mirror 6 while changing its reflecting direction as shown in FIG. 1. Then, the light beam reflected by the stationary mirror 6 goes onto the photo-sensitive sheet 25 as the line beam.

A description will be given of the sub-scanning mechanism. As shown in FIG. 1, the sub-scanning unit (a U-shaped frame as illustrated) 26, which has an aperture (an internal groove) 26A on the top thereof, is set on a rail 27 at the bottom wall 2 of the housing 1 in a manner that is movable in the sub-scanning direction (the direction of y in FIG. 1). The photo-sensitive sheet 25 is set on the aperture 26A.

A rotary shaft 28 provided with a lead screw is rotatably supported on a bearing 13C, which is fixed to the side wall 12 of the housing 1. The lead screw of the rotary shaft 28 is engaged with a connecting member 29, which is secured to the sub-scanning unit 26.

A pulley 30 is secured to the rotary shaft 28, and a pulley 31 is secured to the rotary shaft 15. A belt 32 is stretched between the pulley 30 and the pulley 31. Hence, the rotary shaft 28 is rotated by the motor 14 in a revolving rate which is slower than that of the rotary shaft 15. Thus, the sub-scanning unit 26 is horizontally moved in the sub-scanning direction by the connecting member 29.

With the main scanning mechanism and the sub-scanning mechanism described above, when the motor 14 rotates, the scanning mirror 5 is oscillated, and thereby the light beam from the LED light source 3 generates the line beam in the main scanning direction. The photo-sensitive sheet 25, which is set on the sub-scanning unit 26, horizontally moves in the sub-scanning direction, and the line beam from the LED light source 3 scans the photo-sensitive sheet 25 in the sub-scanning direction, so that an image can be printed on the photo-sensitive sheet 25.

A description will be given of the operation of the printer which is constructed in the above-mentioned manner. At the start, the sub-scanning unit 26 is in a start printing position (an end of the moving path). When the printer is turned on, the LED light source 3 emits light, and the motor 14 rotates forward. Thereby, the face cam 18 and the press cam 20 rotate, and the swing pin 11 of the swing lever 17 follows the cam profile on the cam face 18A of the face cam 18. Thus, the reflective plane of the scanning mirror 5 oscillates.

The light beam emitted from the LED light source 3 enters the reflective plane of the scanning mirror 5 through the light converging lens 4, and is reflected by the scanning mirror 5. Then, from the scanning mirror 5 the light beam strikes the stationary mirror 6 and goes onto the photo-sensitive sheet 25, which is set at the top of the sub-scanning unit 26.

On the other hand, the motor 14 moves the sub-scanning unit 26 in the forward direction of the y-axis in FIG. 1, and the photo-sensitive sheet 25 moves in the sub-scanning direction. Thus, the line beam from the LED light source 3 is projected on the whole of photo-sensitive sheet 25, so that a image can be printed on the photo-sensitive sheet 25.

After the image is printed on the photo-sensitive sheet 25 and the sub-scanning unit 26 reaches the other end of the moving path, the motor 14 reverses at a high speed and the sub-scanning unit 26 returns to the start printing position at a high speed. Then, preparations are made for another printing.

In this embodiment, the printer uses the LED light source, but the present invention should not be restricted to this. The present invention may also be applied to a printer which uses another light source such as a laser.

The cam mechanism which oscillates the scanning mirror 5 as described in this embodiment may also be applied to another equipment.

Figure 3:
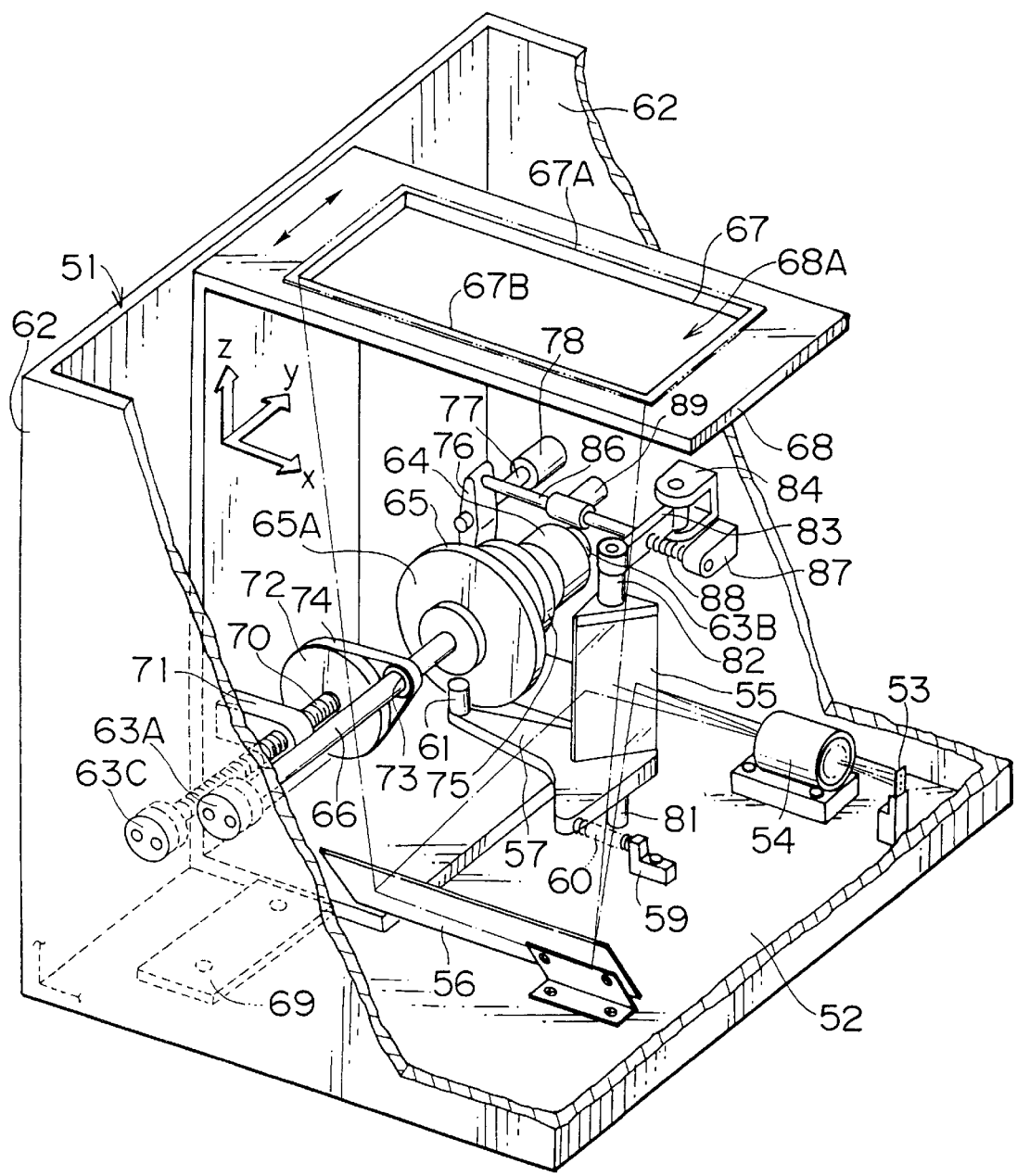
FIG. 3 is a perspective view illustrating the construction of a printer according to the second embodiment of the present invention.

An explanation will be given of a printer according to the second embodiment of the present invention. FIG. 3 is a perspective view illustrating the construction of the printer according to the second embodiment of the present invention. The printer in FIG. 3 is provided with a main scanning mechanism which generates a line beam by swinging a beam of light in a main scanning direction (the direction of x in FIG. 3), and a sub-scanning mechanism which moves a photo-sensitive sheet 67 which is placed on a sub-scanning unit 68 so that the photo-sensitive sheet 25 can be sequentially scanned with the line beam in a sub-scanning direction (the direction of y in FIG. 3).

An description will be give of the main scanning mechanism. As shown in FIG. 3, an LED light source 53, a light converging lens 54, a scanning mirror 55, a stationary mirror 56, are arranged on a bottom wall 52 of a housing 51.

The LED light source 53 is composed of three LEDs for example, and the LEDs respectively output light of three wavelengths according to the wavelengths of colors to be generated on the photo-sensitive sheet 67. The intensity of the light of each LED is modulated in accordance with a printed image. The light converging lens 54 converges LED light which is emitted from the LED light source 53 into a light beam which is focused on the photo-sensitive sheet 67, and the LED light falls on a reflective face of the scanning mirror 55.

Figure 4:
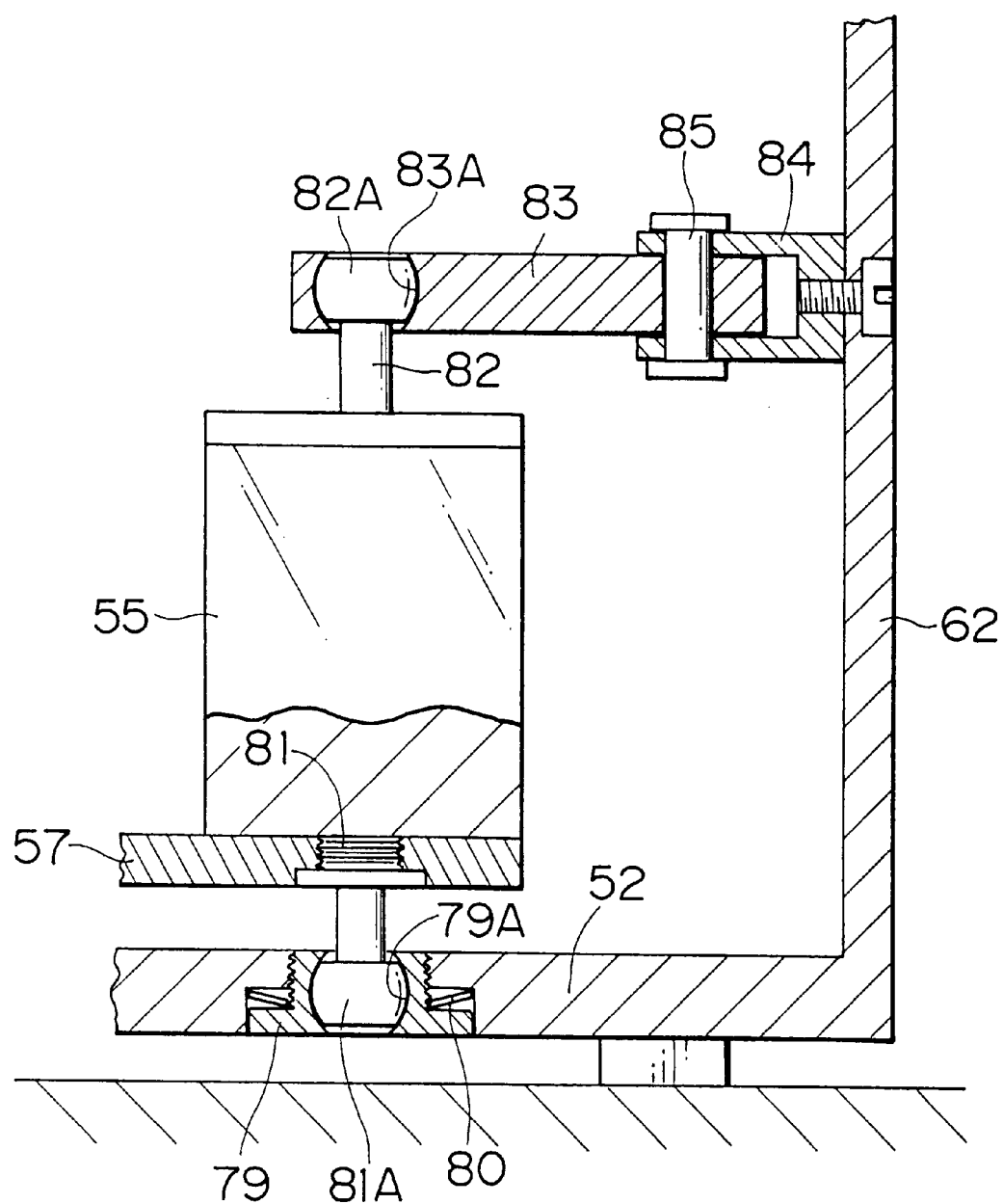
FIG. 4 is a sectional view illustrating the construction of a swinging mechanism of a scanning mirror in the printer in FIG. 3.

The scanning mirror 55 is mounted on a swing lever 57, which is supported by a supporting member 81. As shown in FIG. 4, the swing lever 57 connects to the top end of the supporting member 81 with a screw. The supporting member 81 has an outer spherical surface 81A at the bottom end, which connects to an inner spherical surface 79A of a holding member 79, which is mounted at the bottom wall 52 of the housing 51. The supporting member 81 can rotate and tilt. A member 80 between the holding member 79 and the bottom wall 52 is a wave washer 80 which adjusts the connection. A connecting member 82 connects to the top of the scanning mirror 55. The connecting member 82 has an outer spherical surface 82A at the top end, which connects to an inner spherical surface 83A of a lever 83. The lever 83 connects to a supporting member 84, which is secured to the side wall 62 of the housing 51, with a shaft 85 in a manner that is rotatable around the shaft 85.

As shown in FIG. 3, a holding member 87 is secured to the side wall 62 of the housing 51, and a compression spring 88, which is supported by the holding member 87, is attached to the lever 83. The lever 83 is connected to a link member 76 by a connecting rod 86, which is supported by a supporting member 89 in a manner that is movable straight. The link member 76 is rotatably attached to a bearing 78 with a rotary shaft 77, and the bearing 78 is secured to the side wall 62 of the housing 51. The link member 76 contacts a cam face of a circumferential cam 75, which is rotated by a motor 64.

The link member 76 is pressed on the cam face of the circumferential cam 75 by the spring 88, and swings to follow a cam profile on the cam face of the circumferential cam 75 when the circumferential cam 75 rotates. Thereby, the lever 83 is swung on the shaft 85 by the connecting rod 86 in connection with the link member 76. The scanning mirror 55 as well as the lever 57 is swung (tilted) by the lever 83 in connection with the link member 76, and the reflective plane of the scanning mirror 55 swings (tilts) about the bottom end of the supporting member 81.

On the other hand, as shown in FIG. 3, a swing pin 61 is rotatably provided at the end of the swing lever 57, and the swing pin 61 contacts a cam face 65A of a face cam 65, which is rotated by the motor 64. A compression spring 60 is supported by a spring supporting member 59 fixed to the bottom wall 52 of the housing 51, and the compression spring 60 is attached to one end of the swing lever 57. Thereby, the pin 61 is pressed on the cam face 65A of the face cam 65. When the motor 64 rotates the face cam 65, the swing lever 57 is rotated about the supporting member 81 by the swing pin 61, and the reflective plane of the scanning mirror 55 swings about the axis which goes through the supporting member 81, the scanning mirror 55 and the connecting member 82.

The circumferential cam 75 and the face cam 65 are secured to the rotary shaft 66, which is rotated by the motor 64, and they rotate in connection with the motor 64. On end of the rotary shaft 66 is rotatably supported by a bearing 63A, which is secured to the side wall 62 of the housing 51. The other end of the rotary shaft 66 connects to an output shaft of the motor 64. The motor 64 is mounted on a bearing 63B, which is secured to the side wall 62.

Thus, when the motor 64 rotates, the circumferential cam 75 and the face cam 65 rotate at the same time, and the reflective plane of the scanning mirror 55 is swung (tilted) about the bottom end of the supporting member 81 by the link member 76 and is swung about the axis which goes through the supporting member 81, the scanning mirror 55 and the connecting member 82 by the swing pin 61.

If the scanning mirror 55 swings, the light beam, which is emitted from the LED light source 53 and enters the scanning mirror 55 through the light converging lens 54, enters the stationary mirror 56 while changing its reflecting direction. The light beam, reflected by the stationary mirror 56, generates a line beam, and the line beam goes onto the photo-sensitive sheet 67.

A description will be given of the sub-scanning mechanism. As shown in FIG. 3, the sub-scanning unit (a U-shaped frame as illustrated) 68, which has an aperture (an inner groove) 68A on the top thereof, is disposed on a rail 69 at the bottom wall 52 of the housing 51 in a manner that is movable in the sub-scanning direction (the direction of y in FIG. 3). The photo-sensitive sheet 67 is set on the aperture 68A.

A rotary shaft 70 provided with a lead screw is rotatably supported on a bearing 63C, which is secured to the side wall 62 of the housing 51. A connecting member 71, which is secured to the sub-scanning unit 68, is engaged with the lead screw of the rotary shaft 70.

A pulley 72 is secured to the rotary shaft 70, and a pulley 73 is secured to the rotary shaft 66. A belt 74 is stretched between the pulley 72 and the pulley 73. Hence, the rotary shaft 70 is rotated by the motor 64 in a revolving rate which is slower than that of the rotary shaft 66. Thus, the sub-scanning unit 68 is moved horizontally in the sub-scanning direction by the connecting member 71.

With the above-described main scanning mechanism and sub-scanning mechanism, the scanning mirror 55 swings when the motor 64 rotates, and the light beam from the LED light source 53 is scanned in the main scanning direction to thereby generate a line beam. The photo-sensitive sheet 67 set on the sub-scanning unit 68 moves horizontally in the sub-scanning direction, and the line beam from the LED light source 53 is scanned in the sub-scanning direction on the photo-sensitive sheet 67. Thus, an image is printed on the photo-sensitive sheet 67.

A description will be given of the operation of the printer which is constructed in the above-mentioned manner. At the start, the sub-scanning unit 68 is in a start printing position (an end of the moving path). When the printer is turned on, the LED light source 53 emits light, and the motor 64 rotates forward. Thereby, the face cam 65 and the circumferential cam 75 rotate, and the swing pin 61 of the swing lever 57 swings in contact with the cam face 65A of the face cam 65. The link member 76 swings in contact with the cam face of the circumferential cam 75. Thus, the reflective plane of the scanning mirror 55 swings.

Figure 5:
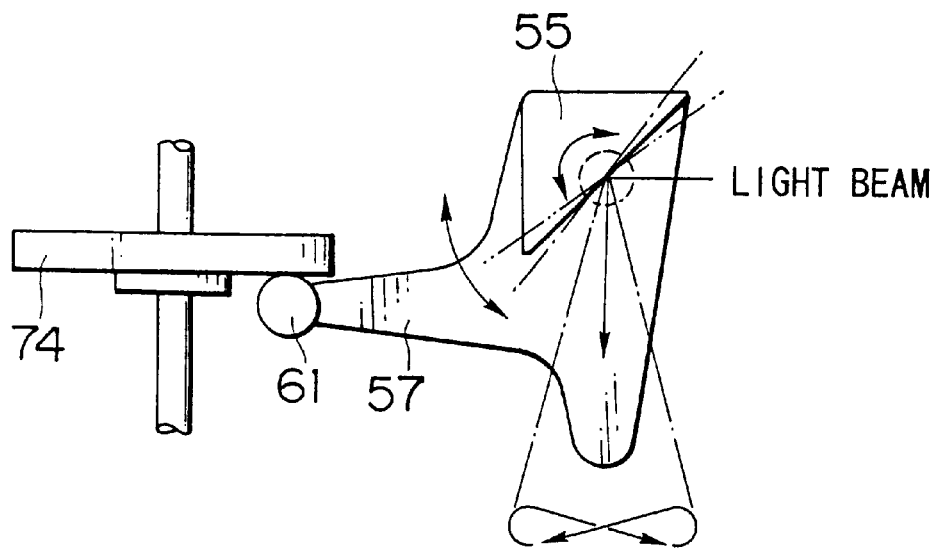
FIG. 5 is a view illustrating the track of a light beam which is scanned by the scanning mirror.

The light beam emitted from the LED light source 53 enters the reflective plane of the scanning mirror 55 through the light converging lens 54, and is reflected by the scanning mirror 55 with changing the reflecting direction as shown in FIG. 5. The stationary mirror 56 reflects the light beam onto the photo-sensitive sheet 67, which is set on the sub-scanning unit 68.

On the other hand, the sub-scanning unit 68 moves in the forward direction of the y-axis on the start of the motor 64, and the line beam emitted from the LED light source 53 goes onto the photo-sensitive sheet 67 so that the photo-sensitive sheet 67 can be printed from one end 67A thereof to the other end 67B.

Figure 6A:
FIGS. 6(A) and 6(B) are views illustrating the track of the light beam.
Figure 6B:
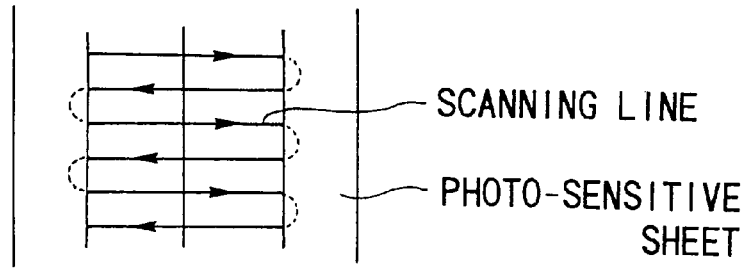

FIG. 6(A) is a view taken from the front, which illustrates the track of the light beam reflected by the scanning mirror 55, and FIG. 6(B) illustrates the track (the scanning line) of the light beam on the photo-sensitive sheet 67. As shown in FIG. 6(A), the light beam, which enters the reflective plane when the scanning mirror 55 swings, is reflected in such a way as to form the track represented with solid lines and dotted lines in the drawing. The light beam is actually emitted from the LED light source 53 in areas indicated with the solid lines in FIG. 6(A). In this case, as represented with solid lines in FIG. 6(B), the light beam describes the horizontal scanning lines on the photo-sensitive sheet 67, which moves the sub-scanning direction, and the light beam is horizontally scanned back and forth. Thus, all the scanning lines can be parallel.

After the image is completely printed on the photo-sensitive sheet 67 and the sub-scanning unit 68 reaches the other end of the moving path, the motor 64 reverses at a high speed and the sub-scanning unit 68 returns to the start printing position at a high speed. Then, preparations are made for another printing.

As stated above, the LED light source is used in this embodiment, but the present invention may also be applied to a printer which uses another light source such as a laser.

In the printer of this embodiment, the sub-scanning unit 68 moves the photo-sensitive sheet 67 in the sub-scanning direction so as to scan the light beam in the sub-scanning direction. The present invention, however, should not be restricted to this. For example, the present invention may also be applied to a printer which moves the mirror 66 in the sub-scanning direction so as to scan the light beam in the sub-scanning direction.

A description will be given of the third embodiment of the printer according to the present invention. FIG. 7 is a perspective view illustrating the construction of the printer according to the third embodiment of the present invention. The printer in FIG. 7 is provided with a main scanning mechanism which generates a line beam by swinging a light beam in a main scanning direction (the direction of x in FIG. 7) to thereby generate a line beam, and a sub-scanning mechanism which moves a photo-sensitive sheet 117, which is placed on a sub-scanning unit 118, in a sub-scanning direction (the direction of y in FIG. 7) to sequentially scan the line beam in the sub-scanning direction.

First, an explanation will be given of the main scanning mechanism. As shown in FIG. 7, an LED light source 103, a light converging lens 104, a scanning mirror 105, a stationary mirror 106, etc. are arranged on a bottom wall 102 of a housing 101.

The LED light source 103 is composed of three LEDs for example, and the LEDs respectively output light of three wavelengths according to the wavelengths of colors to be generated on the photo-sensitive sheet 117. The intensity of the LED light emitted from the LED light source 103 is modulated according to a print image. The LED light from the LED light source 103 becomes a light beam which is focused on the photo-sensitive sheet 117 through the light converging lens 104, and the line beam enters a reflective plane of the scanning mirror 105.

The scanning mirror 105 is mounted on a swing lever 107, which is rotatably supported by a support 108 at the bottom wall 102 of the housing 101. A swing pin 111 is rotatably provided at the end of the swing lever 107, and the swing pin 111 contacts a cam face 115A of a face cam 115, which is rotated by a motor 114. A compression spring 110 is attached to one end of the swing lever 107, and the compression spring 110 is supported by a spring supporting member 109 which is fixed to the bottom wall 102 of the housing 101. Thereby, the swing pin 111 contacts the cam face 115A of the face cam 115 with elasticity.

On the other hand, the face cam 115 is secured to a rotary shaft 116. One end of the rotary shaft 116 is rotatably supported by a bearing 113A which is secured to a side wall 112 of the housing 101, and the other end thereof connects to an output shaft of the motor 114. The motor 114 is mounted on a bearing 113B which is secured to the side wall 112. Thus, when the motor 114 rotates, the face cam 115 rotates, and the swing pin 111, which contacts the cam face 115A of the face cam 115, swings forward and backward along a cam profile on the cam face 115A. Then, the swing lever 107 and the scanning mirror 105 swing in connection with the swing pin 111, and the reflective plane of the scanning mirror 105 rotates.

FIG. 8 is a graph showing an example of the cum curve (cam profile) of the cam face 115A. FIG. 8 shows coordinates of positions on the cam face 115A along an arrow A shown in FIG. 7. As shown in FIG. 8, the cam face 115A slowly moves in the negative direction of the y-axis from a position indicated by a point a to a position indicated by a point b. The cam face 115A moves in a sharp inclination from the position of the point b to the position of the point a in the positive direction of the y-axis. When the face cam 115 rotates in a direction indicated by an arrow B in FIG. 7 (forward rotation), the swing pin 111 of the swing lever 107 moves with respect to the cam face 115A in a direction indicated by an arrow C in FIG. 8, and the light beam which is reflected by the reflective plane of the scanning mirror 105 moves back and forth in the main scanning line (the direction of x in FIG. 7). The light beam is actually emitted from the LED light source 103 while the swing pin 111 contacts the cam face 115A in an area between a point a' and a point b' in FIG. 8. In this area, the light beam moves forward along the x-axis on the photo-sensitive sheet 117.

As stated above, the light beam emitted from the LED light source 103 enters the scanning mirror 105 through the light converging lens 104. When the scanning mirror 105 swings, the light beam enters the stationary mirror 106, changing its reflecting direction to the main scanning line. The light beam is reflected by the stationary mirror 106, and scans in the main scanning line to become a line beam, which goes onto the photo-sensitive sheet 117.

A description will be given of the sub-scanning mechanism. As shown in FIG. 7, the sub-scanning unit (a U-shaped frame as illustrated) 118, which is provided with an aperture (an inner groove) 118A on the top thereof, is disposed on a rail 119 at the bottom wall 102 of the printer 101 in a manner that is movable in a sub-scanning direction (the direction of y in FIG. 7). The photo-sensitive sheet 117 is set on the aperture 118A.

A rotary shaft 120 with a lead screw is rotatably supported by a bearing 113C which is secured to the side wall 112 of the housing 101. A connecting member 121, which is secured to the sub-scanning unit 118, is engaged with the lead screw of the rotary shaft 120.

A pulley 122 is secured to the rotary shaft 120, and a pulley 123 is secured to a rotary shaft 116. A belt 124 is stretched between the pulley 122 and the pulley 123. Hence, the rotary shaft 120 is rotated by the motor 114 in a revolving rate which is slower than that of the rotary shaft 116. When the rotary shaft 120 rotates, the sub-scanning unit 118 horizontally moves in the sub-scanning direction via the connecting member 121.

With the main scanning mechanism and the sub-scanning mechanism, the scanning mirror 105 swings when the motor 114 rotates, and the light beam from the LED light source 103 scans in the main scanning line to thereby generate a line beam. The photo-sensitive sheet 117 set on the sub-scanning unit 118 horizontally moves in the sub-scanning direction, and the line beam from the LED light source 103 scans in the sub-scanning direction on the photo-sensitive sheet 117. Thus, an image can be printed on the photo-sensitive sheet 117.

As shown in FIG. 7, a cut 118B is formed at the bottom of the sub-scanning unit 118, and a restriction piece 125 is arranged in the cut 118B. A rail 126 is provided at the bottom wall 102 of the housing 101 in the sub-scanning direction. The restriction piece 125 is movably placed on the rail 126. The restriction piece 125 moves in the sub-scanning direction in contact with a front face 130A or a back face 130B within the cut 118B in the sub-scanning unit 118.

A step is formed at the right side of the restriction piece 125, which has a side 127A and a side 127B which projects farther than the side 127A. On the other hand, a pin 128 is rotatably attached to one end of the bottom of the swing lever 107. When the restriction piece 125 moves until the side 127B thereof reaches the pin 128, the side 127B of the restriction piece 125 contacts and pushes the pin 128 of the swing lever 107. Thereby, the swing lever 107 rotates about the support 108 against the force of the compression spring 110. Thus, the swing pin 111 leaves the cam face 115A of the face cam 115.

Next, a description will be given of the operation of the printer which is constructed in the above-mentioned manner. At the start, the sub-scanning unit 118 and the restriction piece 125 are positioned at the front ends (start sub-scanning positions) as shown in the plan view of FIG. 9. When the printer is turned on, the LED light source 103 emits light, the motor 114 rotates forward, and the face cam 115 starts rotating. Then, the swing pin 111 of the swing lever 107 swings in contact with the cam face 115A of the face cam 115, and the scanning mirror 105 swings. Thereby, the line beam from the LED light source 103 is projected to one end 129A of the photo-sensitive sheet 117 which is set on the sub-scanning unit 118.

At the same time, the sub-scanning unit 118 moves in the forward direction of the y-axis on the start of the motor 114. The line beam from the LED light source 103 scans in the sub-scanning direction.

When the sub-scanning unit 118 moves a predetermined distance in the forward direction of the y-axis, the front face 130A of the cut 118B in the sub-scanning unit 118 abuts on the restriction piece 125. If the sub-scanning unit 118 further moves in the forward direction of the y-axis, the restriction piece 125 also moves in connection with the sub-scanning unit 118. Then, the sub-scanning unit 118 moves to the complete sub-scanning position, and the line beam is projected to the one end 129B of the photo-sensitive sheet 117. Thereafter, the sub-scanning unit 118 further moves in the forward direction of the y-axis past the complete sub-scanning position, and the side 127B of the restriction piece 125 contacts and pushes the pin 128 of the swing lever 107. Thereby, the swing lever 107 rotates as shown in FIG. 11, so that the swing pin 111 leaves the cam face 115A of the face cam 115.

After the image is completely printed on the photo-sensitive sheet 117 and the sub-scanning unit 118 moves to the rear end, the motor 114 reverses at a high speed and the sub-scanning unit 118 returns to the start sub-scanning position at a high speed. When the sub-scanning unit 118 moves in the negative direction of the y-axis, the swing pin 111 is kept far from the cam face 115A of the face cam 115 while the restriction piece 125 remains stationary. Thus, when the sub-scanning unit 118 returns to the start sub-scanning position, the swing lever 107 does not swing, and the swing pin 111 does not contact the cam face 1 15A. Hence, the noise can be reduced, and the load of the motor 114 is decreased.

Figure 9:
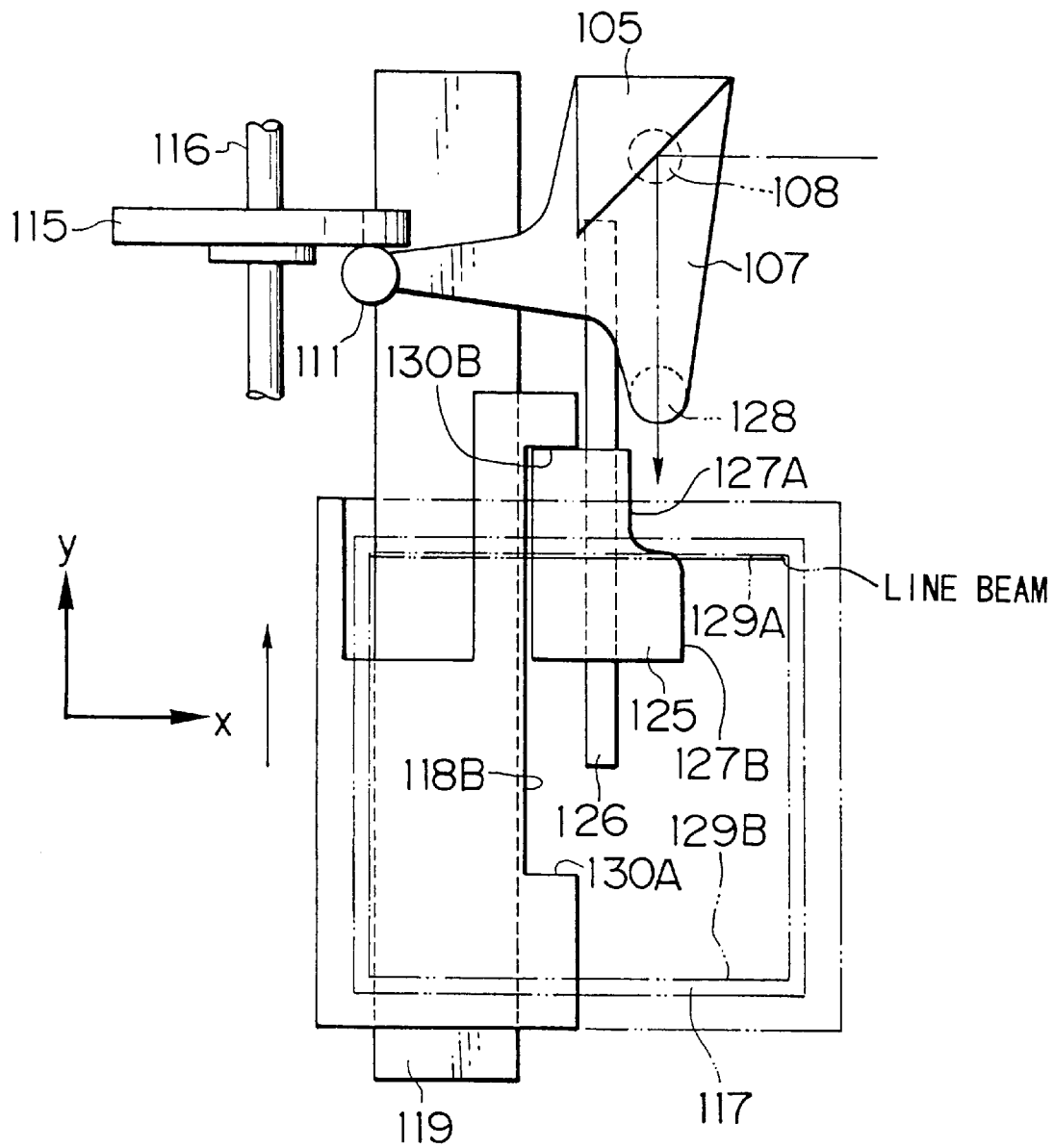
FIG. 9 is a plan view illustrating a state of a sub-scanning unit, a restriction piece and a swing lever.
Figure 10:
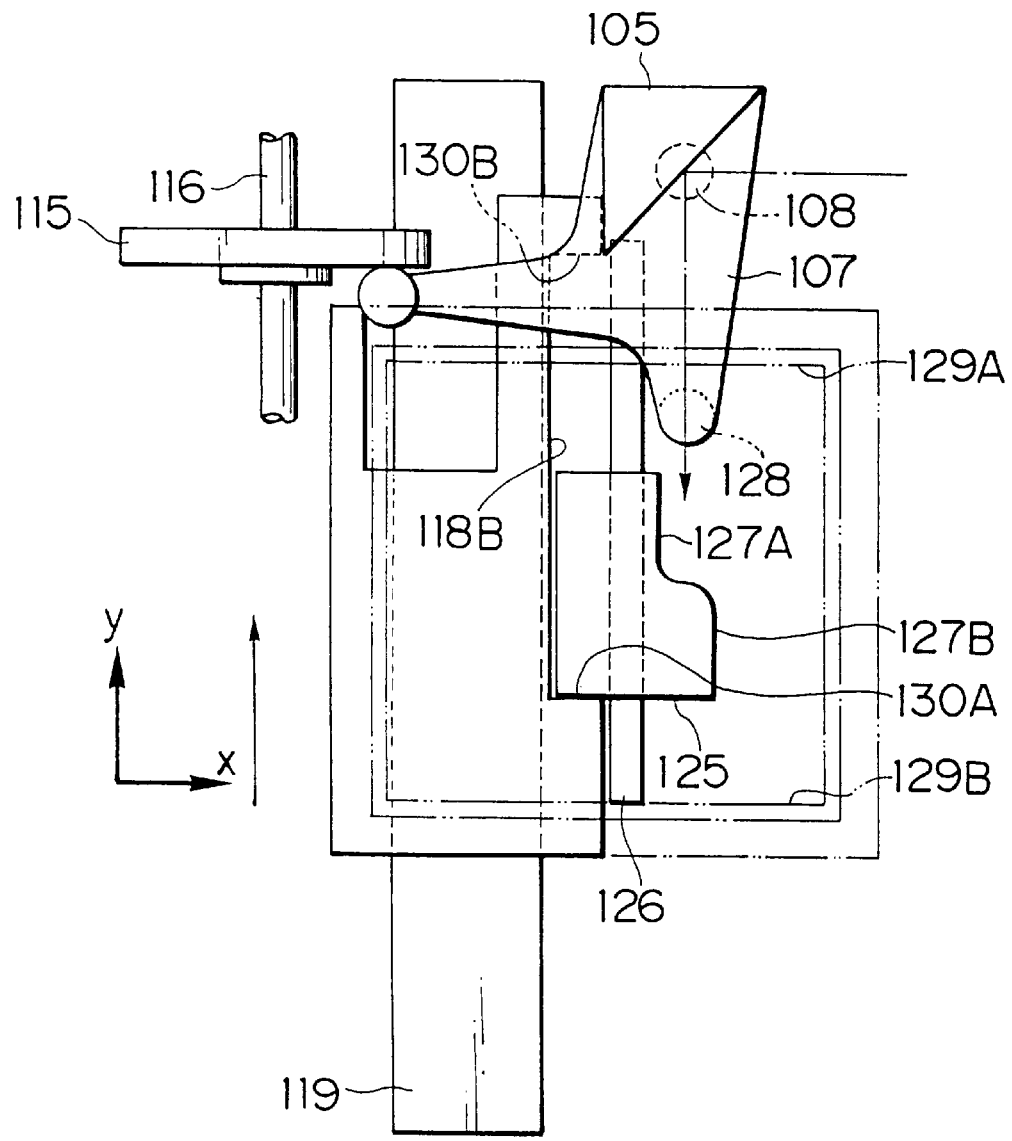
FIG. 10 is a plan view illustrating a state of the sub-scanning unit, the restriction piece and the swing lever.
Figure 12:
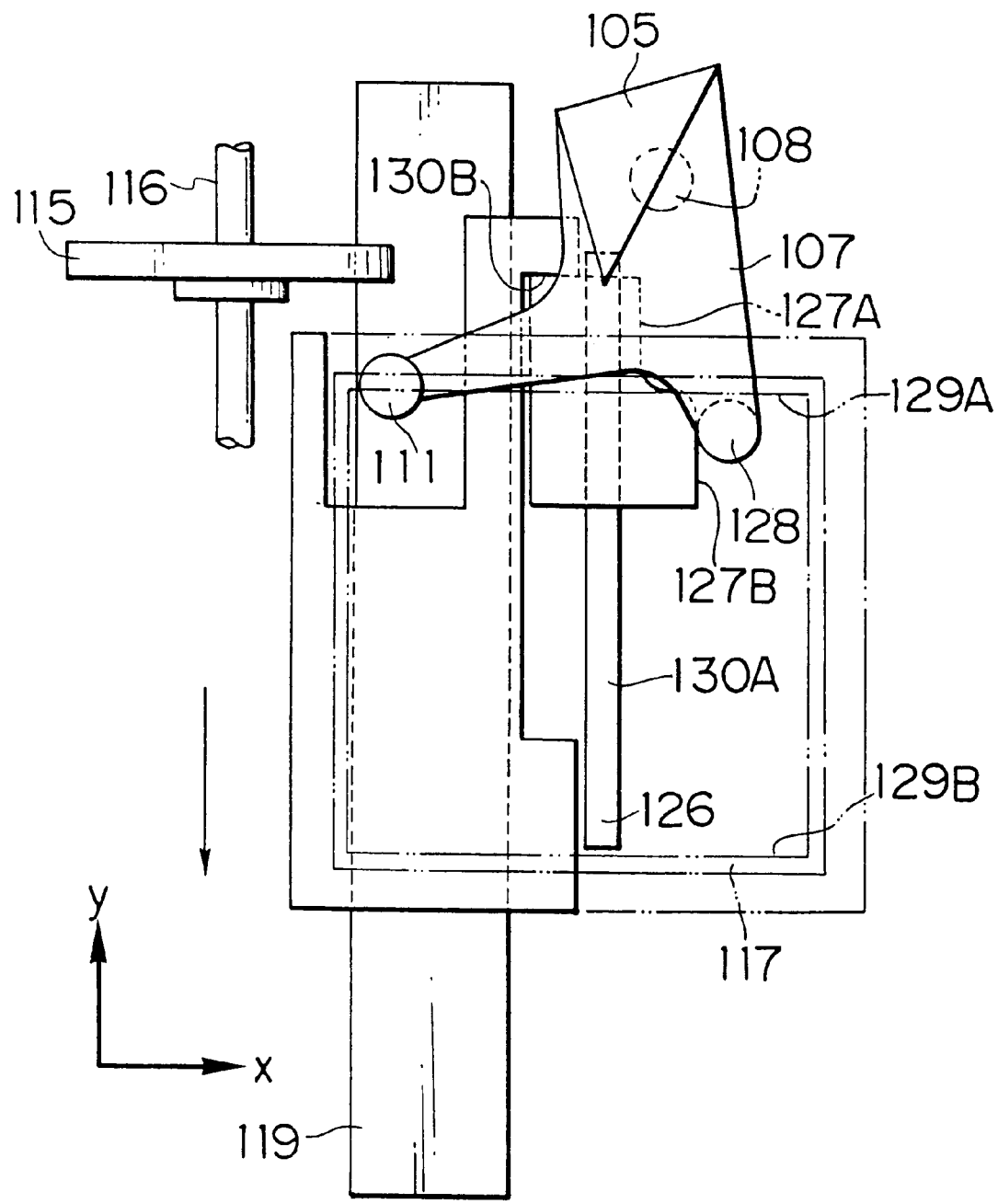
FIG. 12 is a plan view illustrating a state of the sub-scanning unit, the restriction piece and the swing lever.

As shown in FIG. 12, the sub-scanning unit 118 further moves in the negative direction of the y-axis, and the back face 130B of the cut 118B in the sub-scanning unit 118 abuts on the restriction piece 125. Thereafter, the restriction piece 125 moves and returns to the front end (the start sub-scanning position) in connection with the sub-scanning unit 118, and the pin 128 of the swing lever 107 leaves the side 127B and the side 127A of the restriction piece 125 as shown in FIG. 9. Thereby, preparations are complete for another printing.

As stated above, when the sub-scanning unit 118 returns to the start sub-scanning position at a high speed after the sub-scanning unit 118 moves from the start sub-scanning position to complete printing the image on the photo-sensitive sheet 117, the swing pin 111 which swings the scanning mirror 105 is separated from the cam face 115A of the face cam 115. For this reason, even if the sub-scanning unit 118 is fed from the start sub-scanning position to the complete sub-scanning position by rotating the motor at one thousand rpm, and is returned from the complete sub-scanning position to the start sub-scanning position by rotating the motor at two thousand rpm, the motor 114 can rotate enough with light load, and the cam does not jump, so that a shock noise will be small. Thus, the motor can rotate at higher speed.

The LED light source is used in this embodiment, however, the present invention may also be applied to a printer which uses another light source such as a laser.

In the printer of this embodiment, the sub-scanning unit 118 moves the photo-sensitive sheet 117 in the sub-scanning direction so as to scan the light beam in the sub-scanning direction. The present invention, however, should not be restricted to this. For example, the present invention may also be applied to a printer which moves the mirror 106 in the sub-scanning direction so as to scan the light beam in the sub-scanning direction. In this case, the moving mechanism for moving the mirror 106 is utilized to restrict the swinging of the scanning mirror 105, as is the case with the above-described embodiment.

A description will be given of the fourth embodiment of the printer according to the present invention. FIG. 13 is a perspective view illustrating the construction of a printer according to the fourth embodiment of the present invention. The printer in FIG. 13 is provided with a main scanning mechanism which swings a light beam in a main scanning direction (the direction of x in FIG. 13) to thereby generate a line beam, and a sub-scanning mechanism which moves a photo-sensitive sheet 177, which is placed on a sub-scanning unit 178, in a sub-scanning direction (the direction of y in FIG. 13) to sequentially scan the line beam in the sub-scanning direction.

An explanation will be given of the main-scanning mechanism. As shown in FIG. 13, an LED light source 153, a light converging lens 154, a scanning mirror 155, a stationary mirror 156, etc. are arranged on a bottom wall 152 of a housing 151.

The LED light source 153 is composed of three LEDs for example, and the LEDs respectively output light of three wavelengths according to the wavelengths of colors to be generated on the photo-sensitive sheet 177. The intensity of the LED light from the LED light source is modulated in accordance with a printed image. The LED light from the LED light source 153 becomes a light beam which is focused on the photo-sensitive sheet 177 through the light converging lens 154, and the light beam enters a reflective plane of the scanning mirror 155. The scanning mirror 155 swings to the right and left by means of a cam mechanism which will be described later, and the light beam scans in the main scanning direction (the direction of x in FIG. 13). The light beam is reflected by the stationary mirror 156, and goes onto the photo-sensitive sheet 177 which is placed on the sub-scanning unit 178.

The scanning mirror 155 is mounted on a swing lever 157, which is rotatably supported by a support 158 at the bottom wall 152 of the housing 151. A swing pin (a cam follower) 161 is provided at the end of the swing lever 157, and the swing pin 161 is pinched between a face cam 169 and a press cam 171.

Figure 14:
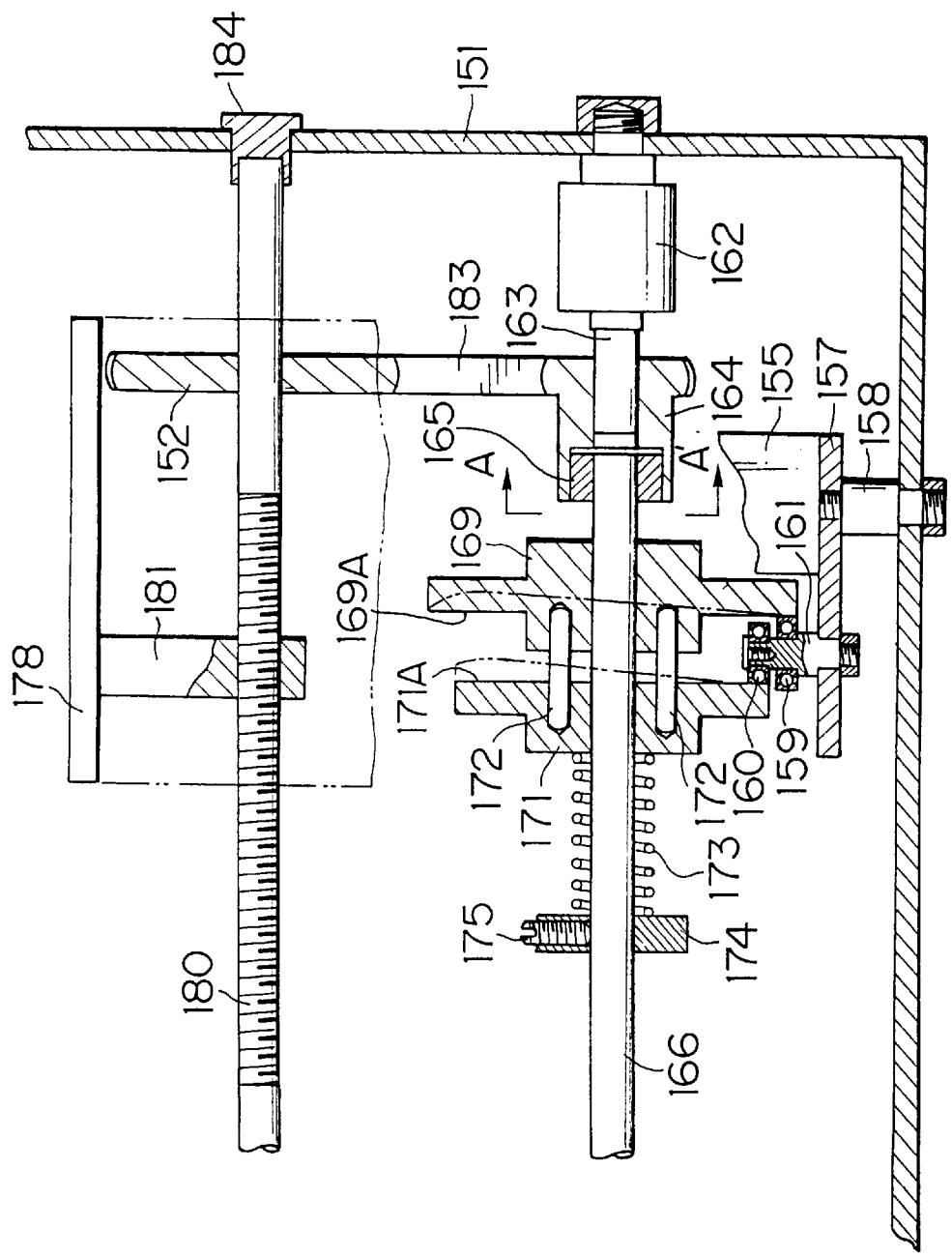
FIG. 14 is a side sectional view of in the printer in FIG. 13.

FIG. 14 is a side sectional view of the printer, illustrating the cam mechanism which swings the scanning mirror 155. As shown in FIG. 14, one end of a rotary shaft 166 is rotatably supported by a bearing 167 (see FIG. 13) which is secured to a side wall of the housing 151, and the other end thereof is connected to an output shaft 163 of a motor 162 via an engagement clutch 165 and a pulley 164. The face cam 169 is secured to the rotary shaft 166. The press cam 171 is mounted to the rotary shaft 166 in a manner that is rotatable around the rotary shaft 166 and movable along the rotary shaft 166. A pair of pins 172, which are secured to the face cam 169, are engaged with the press cam 171 in a manner that the pins 172 can slide in and out, and the press cam 171 rotates in connection with the face cam 169. A spring 173 is attached to the press cam 171, and the spring 173 is fixed by the spring holding member 174. Thereby, the press cam 171 is pressed toward the face cam 169 to thereby exactly press the swing pin 161 against a cam face 169A of the face cam 169. The spring holding member 174 is fixed to the rotary shaft 166 with a setting screw 175.

On the other hand, ball bearings 159, 160, which differ in diameter, are mounted at the end of the swing pin 161, which is provided at the end of the swing lever 157. The ball bearing 159 only contacts the cam face 169A of the face cam 169, and the ball bearing 160 only contacts a cam face 171A of the press cam 171.

Hence, the press cam 171 presses the swing pin 161 toward the face cam 169 with the force of the spring 173 via the ball bearing 160. The ball bearing 159 is pressed against the cam face 169A of the face cam 169 by the force of the spring 173. Thus, the swing pin 161 follows the cam profile on the cam face 169A of the face cam 169.

The cam face 171A of the press cam 171, which faces the cam face 169A of the face cam 169, has a cam profile which matches that of the cam face 169A of the face cam 169 so that the distance between the cam face 171A and the cam face 169A is constant. That is, the cam face 171A of the press cam 171 is formed parallel to the cam face 169A of the face cam 169. Hence, while the rotary shaft 166 is rotating, the press cam 171 hardly moves in the axial direction, and the force of the spring 173 can be substantially constant. Thus, the force which the swing pin 161 applies to the face cam 169 can be substantially constant. Thereby, the force of the spring 173 is reduced, so that the torque of the motor 162 can be small and the motor 162 can be compact.

The output shaft 163 of the motor 162 is connected to the rotary shaft 166 of the cam mechanism by the engagement clutch 165 via the pulley 164. The engagement clutch 165 transmits a rotating force from the output shaft 163 to the rotary shaft 166 only when the motor 162 rotates forward. The engagement clutch 165 does not transmits the rotating force from the output shaft 163 to the rotary shaft 166 when the motor 162 rotates backward.

Figure 15:
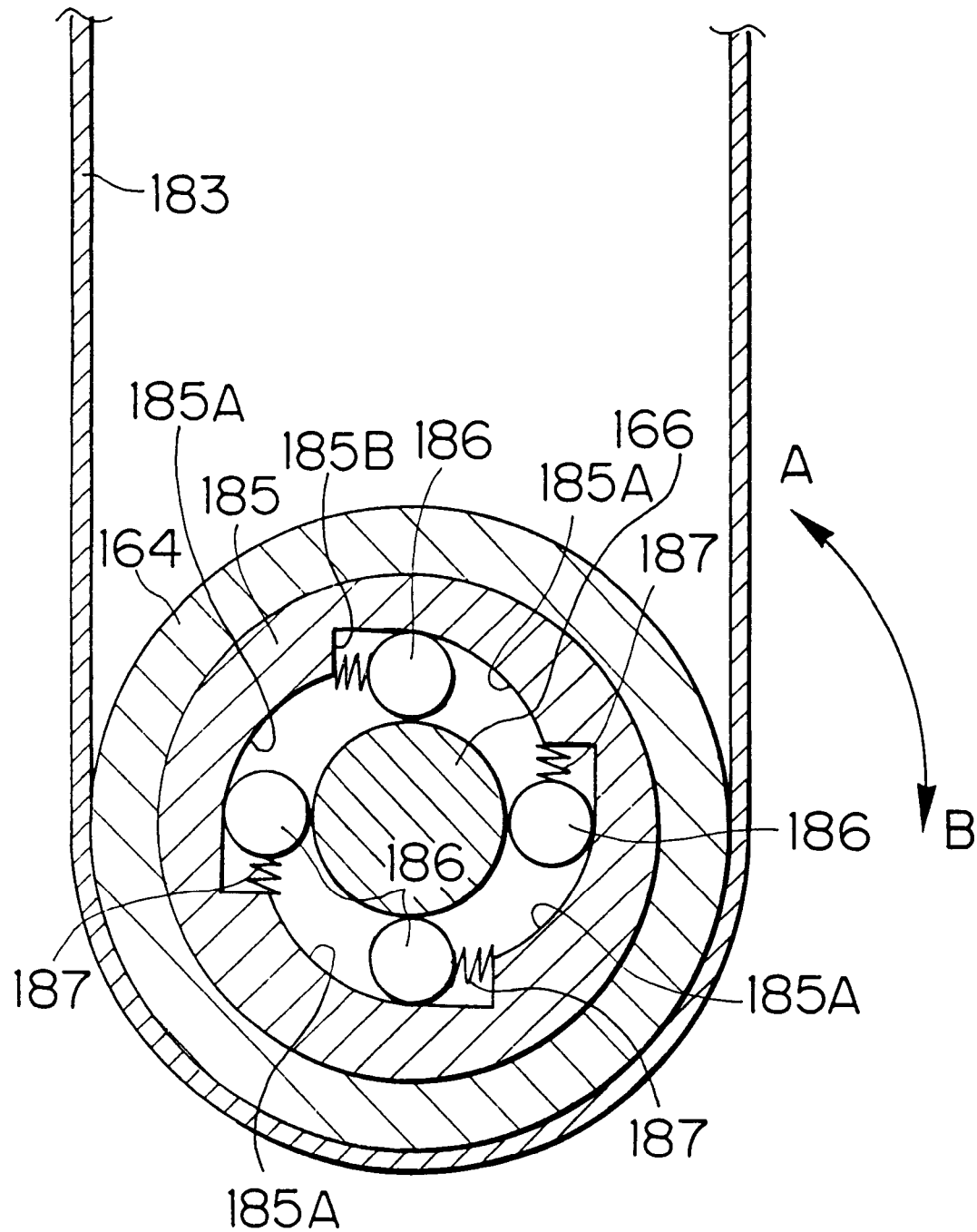
FIG. 15 is a sectional view illustrating the construction of an engagement clutch.

FIG. 15 is a sectional view of the engagement clutch 165 taken along line A-A' in FIG. 14. As shown in FIG. 15, the engagement clutch 165 is fitted in the pulley 164, and a ring 185 of the engagement clutch 165 rotates in connection with the pulley 164. Squeezing faces 185A and angles 185B are formed at regular intervals on the inner circumference of the ring 185. Each squeezing face 185A is formed in such a way that a gap between the squeezing face 185A and the rotary shaft 166, which is inserted at the center of the ring 185, can become narrower clockwise. Rollers 186 are arranged between the squeezing faces 185A and the rotary shaft 166. Springs 187 connect the rollers 186 and the angles 185B.

If the motor 162 rotates the pulley 164 forward (in the direction of A in FIG. 15) via the output shaft 163, the rollers 186 are squeezed between the squeezing faces 185A and the rotary shaft 166. Thus, the rotary shaft 166 rotates forward with the pulley 164.

On the other hand, if the motor 162 rotates the pulley 164 reversely (in the direction of B in FIG. 15) via the output shaft 163, the rollers 186 move toward the springs 187, which are provided between the rollers 186 and the angles 185B. Then, the springs 187 are contracted, and gaps are formed between the rollers 186 and the rotary shaft 166. Thus, the rotary shaft 166 becomes free and remains stationary without rotating reversely.

The engagement clutch 165 prevents the reverse of the cam mechanism which swings the scanning mirror 155. That is, when the motor 162 reverses to return the sub-scanning mechanism to a printing start condition as described later, the rotary shaft 166 cannot rotate due to the operation of the engagement clutch 165. Thereby, the face cam 169 and the press cam 171 remain stationary, and it is possible to avoid contact friction which is generated between the swing pin 161 and the cam faces of the face cam 169 and the press cam 171, and reduce a load torque of the motor 162.

A description will be given of the sub-scanning mechanism. As shown in FIG. 13, the sub-scanning unit (a U-shaped frame as illustrated) 178, which is provided with an aperture (an inner groove) 178A on the top thereof, is placed on a rail 179 at the bottom wall 152 of the housing 151 in a manner that is movable in the sub-scanning direction (the direction of y in FIG. 13). The photo-sensitive sheet 177 is set on the aperture 178A.

A rotary shaft 180 provided with a lead screw is rotatably supported by a bearing 184, which is secured to the side wall of the housing 151. A connecting member 181, which is secured to the sub-scanning unit 178, is engaged with the lead screw of the rotary shaft 180.

The pulley 164 is secured to the output shaft 163 of the motor 162 as stated above, and a pulley 182 of larger diameter than the pulley 164 is secured to the rotary shaft 180. Hence, the rotary shaft 180 is rotated by the motor 162 in a revolving rate which is slower than that of the rotary shaft 166. Thus, the sub-scanning unit 178 is horizontally moved in the sub-scanning direction by the connecting member 181.

With the sub-scanning mechanism, the sub-scanning unit 178 moves back and forth in accordance with the backward and forward rotation of the motor 162.

A description will be given of the operation of the printer which is constructed in the above-mentioned manner. At the start, the sub-scanning unit 178 is in a start printing position (an end of the moving path). When the printer is turned on, the LED light source 153 emits light, the motor 162 rotates the pulley 164 forward, and the rotary shaft 166 is rotated forward via the engagement clutch 165. Thereby, the rotary shaft 180 rotates, and the sub-scanning unit 178 starts moving in the forward direction of the y-axis in FIG. 13. The face cam 169 and the press cam 171 start rotating, and the reflective plane of the scanning mirror 155 swings to the right and left.

The light beam emitted from the LED light source 153 enters the reflective plane of the scanning mirror 155 through the light converging lens 154. When the scanning mirror 155 swings, the light beam scans in the main-scanning direction on the photo-sensitive sheet 177 which is set on the sub-scanning unit 178. When the sub-scanning unit 178 moves, the light beam scans on the photo-sensitive sheet 177 in the sub-scanning direction.

After the sub-scanning unit 178 moves to the other end of the moving path to complete printing, the motor 162 starts reversing at a high speed. When the motor 162 starts reversing, the engagement clutch 165 stops the rotation of the rotary shaft 166, and only the rotary shaft 180 rotates. Thus, the sub-scanning unit 178 moves reversely, and the sub-scanning unit 178 returns to the start printing position at a high speed. Then, preparations are made for another printing.

After the sub-scanning unit 178 returns to the start printing position, at the start of another printing, the direction of the scanning mirror 155 (or an angle of rotation of the rotary shaft 166) is measured so that a print signal (modulated light beam) can synchronize with the direction of the scanning mirror 155.

As stated above, when the sub-scanning unit 178 returns to the start sub-scanning position at a high speed after the completion of printing the image on the photo-sensitive sheet 177 by moving the sub-scanning unit 178 from the start sub-scanning position, the engagement clutch 165 prevents the reverse of the cam mechanism. For this reason, even if the sub-scanning unit 178 is fed from the start sub-scanning position to the complete printing position by rotating the motor 162 at one thousand rpm, and is returned from the complete printing position to the start sub-scanning position by rotating the motor 162 at two thousand rpm, the motor 162 can rotate enough with light load, and the cam does not jump, so that a shock noise will be small.

The printer of this embodiment sub-scans the photo-sensitive sheet 177 by moving the sub-scanning unit 178 on which the photo-sensitive sheet 177 is placed. The present invention, however, should not be restricted to this. In the case of a printer which sub-scans the photo-sensitive sheet 177 by moving the mirror 156, it is possible to prevent the backward rotation of the cam mechanism, which swings the scanning mirror, as is the case with the above-described embodiment.

Figure 17:
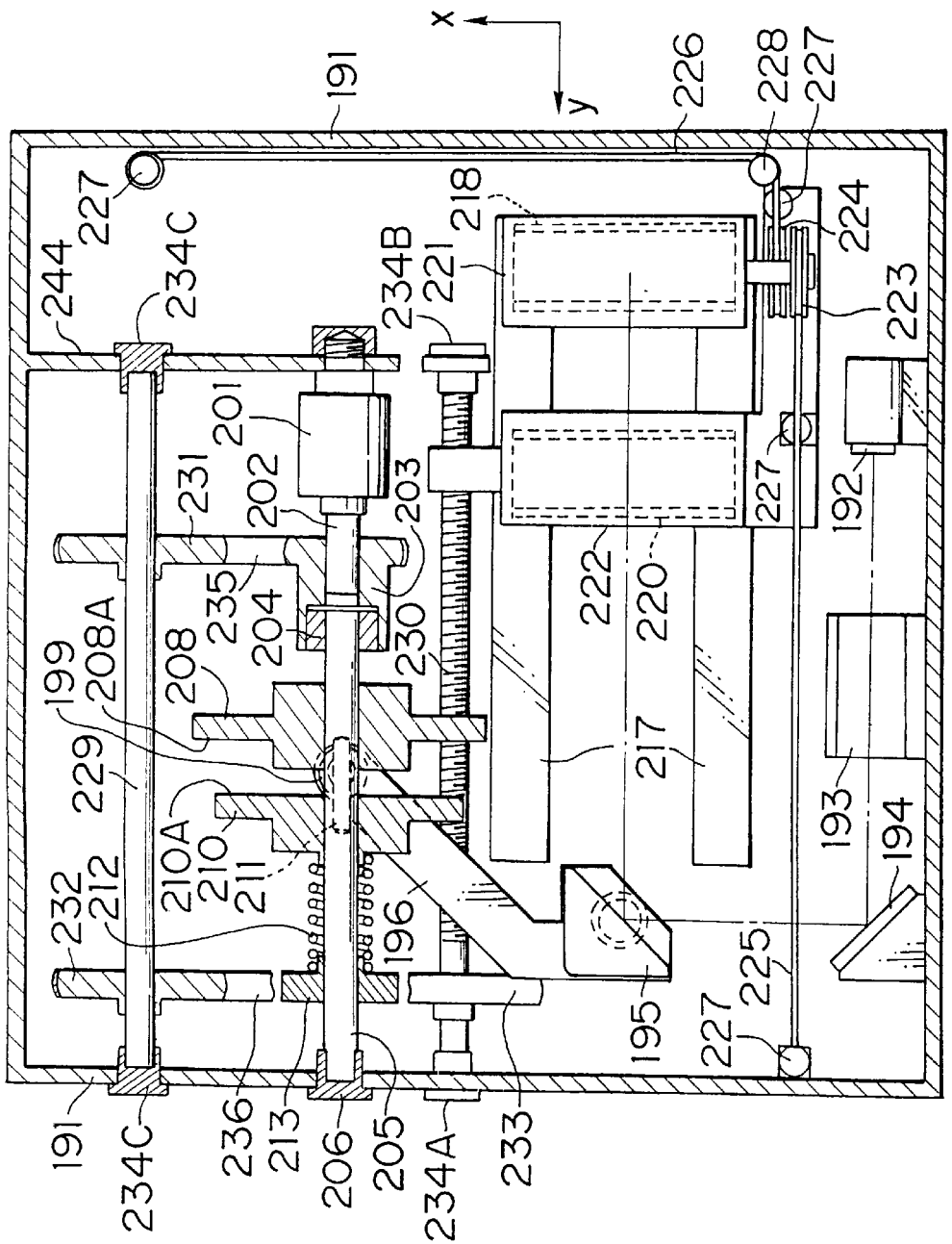
FIG. 17 is a horizontal sectional view illustrating the printer in FIG. 16.

FIGS. 16 and 17 are a side sectional view and a horizontal sectional view, respectively, illustrating the fifth embodiment of the printer which scans the light beam in the sub-scanning direction by moving the mirror unlike the forth embodiment.

The printer in FIGS. 16 and 17 is provided with a main scanning mechanism which generates a line beam by swinging a light beam in a main scanning direction (the direction of x in FIG. 17), and a sub-scanning mechanism which sequentially scans the line beam in the sub-scanning direction on a photo-sensitive sheet 216 which is set on a stage 215. The main scanning mechanism is constructed in the same manner as the main scanning mechanism of the printer which is illustrated in FIGS. 13, 14 and 15.

As shown in FIGS. 16 and 17, the LED light from the LED light source 192 becomes a light beam which is focused on the photo-sensitive sheet 216 through a light converging lens 193, and the light beam enters a reflective plane of a scanning mirror 195 via a stationary mirror 194. The scanning mirror 195 swings to the right and left with a cam mechanism which will be described later. The scanning mirror 195 scans the light beam in the main scanning direction to enter a mirror box 221. Mirrors 218, 219 are mounted in the mirror box 221, and the light beam enters the mirror box 221 and is reflected by the mirrors 218, 219. Then, the light beam enters a mirror box 222. A mirror 220 is mounted in the mirror box 222, and the light beam, which enters the mirror box 222, is reflected onto the photo-sensitive sheet 216 by the mirror 220. The mirror boxes 221, 222 move in the sub-scanning direction with an optical path length between the LED light source 192 and the photo-sensitive sheet 216 being constant, and sub-scans the light beam.

An explanation will be given of the main scanning mechanism. The scanning mirror 195, which swings the light beam in the main scanning direction, is secured to a swing lever 196. The swing lever 196 is rotatably supported by a supporting member 240, which is secured to the housing 191, via a supporting member 197. A swing pin 200 is attached to the end of the swing lever 196, and the swing pin 200 is pinched between the face cam 208 and the press cam 210. Ball bearings 198, 199 of different diameters are mounted at the end of the swing pin 200. The ball bearing 198 contacts a cam face 208A of the face cam 208, and the ball bearing 199 contacts a cam face 210A of the press cam 210.

The face cam 208 and the press cam 210 are mounted on a rotary shaft 205, and the press cam 210 rotates in connection with the face cam 208, which is secured to the rotary shaft 205, via pins 211. The press cam 210 is pushed toward the face cam 208 by a spring 212 which is fixed to the spring holding member 213. The spring holding member 213 is fixed to the rotary shaft 205 with a set screw 214.

The rotary shaft 205 is rotatably supported by a bearing 206 which is secured to the wall of the housing 191, and the rotary shaft 205 connects to an output shaft 202 of a motor 201 via an engagement clutch 204 and a pulley 203. The engagement clutch 204 is constructed in the same manner as the engagement clutch 165 shown in FIGS. 14 and 15. When the motor 201 rotates forward, the engagement clutch 204 transmits a rotating force from the output shaft 202 to the rotary shaft 205, and when the motor 201 rotates backward, the engagement clutch 204 does not transmit the rotating force from the output shaft 202 to the rotary shaft 205.

With the above-described main scanning mechanism, when the motor 202 rotates backward after printing and the later-described sub-scanning mechanism reverses to the start sub-scanning state, only the pulley 203 rotates backward and the rotary shaft 205 becomes free and stops rotating. Thus, the later-described sub-scanning mechanism is only driven. Then, it is possible to avoid contact friction which is generated between the swing pin 200 and the cam faces of the face cam 208 and the press cam 210, and reduce a load torque of the motor 201.

Figure 18:
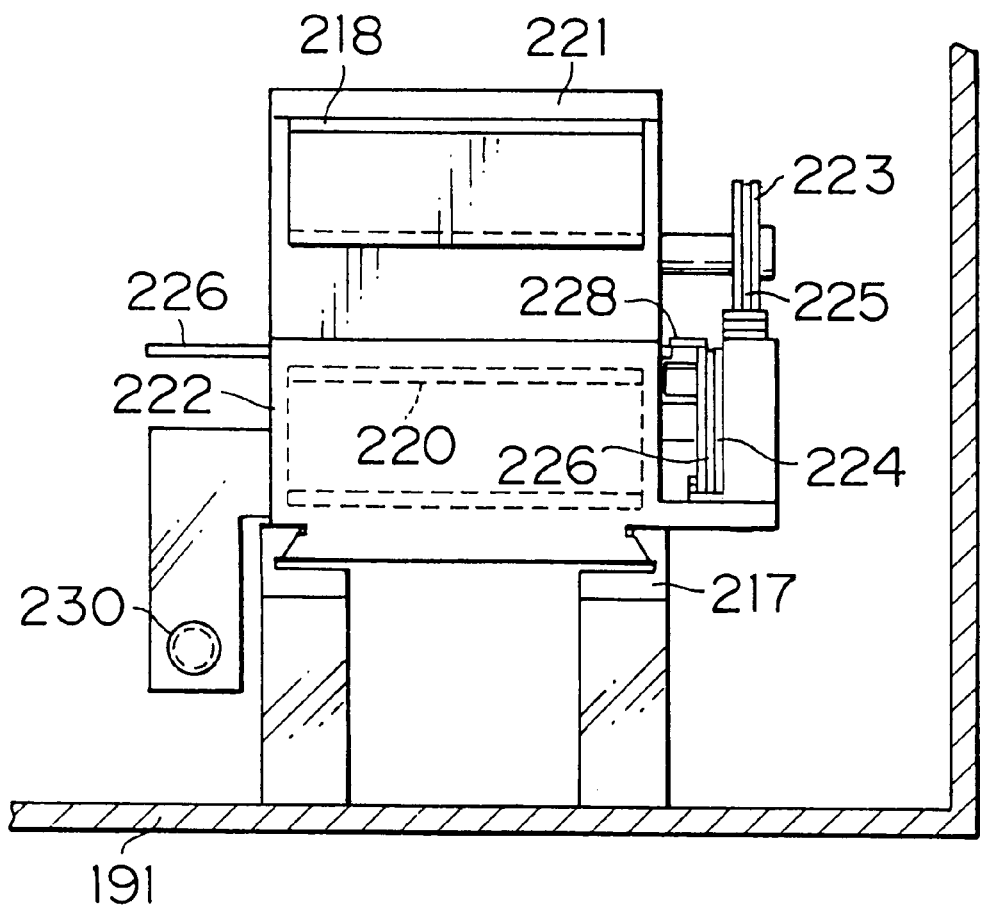
FIG. 18 is a sectional view taking along line A-A' in FIG. 16.

A description will be given of the sub-scanning mechanism. As shown in FIGS. 16, 17 and 18 (FIG. 18 is a sectional view taken along line A-A' of FIG. 16), a pair of rails 217 is provided in the housing 191, and the mirror boxes 212, 222 are arranged on the rails 217 in a manner that is movable straight. Pulleys 223, 224 are mounted on the side of the mirror box 221, and a belt 225 is engaged with a groove on the circumference of the pulley 223. One end of the belt 225 is fixed to a pedestal of the mirror box 222 by a fixing screw 227. The other end of the belt 225 is fixed to a pedestal on the inner wall of the housing 191 with a fixing screw 227.

When the mirror box 222 moves on the rails 217, the mirror box 221 is moved by the belt 225 in connection with the mirror box 222. The moving distance of the mirror box 221 is half of the moving distance of the mirror box 222. Thereby, the line beam is guided to the photo-sensitive sheet 216 on the stage 215 on the optical path of constant length.

On the other hand, an elastic belt 226 is engaged with a groove on the circumference of the pulley 224. One end of the elastic belt 226 is fixed on the pedestal of the mirror box 222 with a fixing screw 227. The other end of the elastic belt 226 is fixed to a pedestal on the inner wall of the housing 191 with a fixing screw 227 via a rotary member 228, which is provided on another pedestal on the inner wall of the housing 191. The elastic belt 226 prevents the belt 225 from becoming loose, and maintains the connection between the mirror boxes 221 and 222.

The mirror box 222 is threaded with a rotary shaft 230 which is provided with a lead screw. The rotary shaft 230 is rotatably supported by a bearing 234A, which is provided on the inner wall of the housing 191, and a bearing 234B, which is supported by a holding member 242. A rotary shaft 229 is rotatably mounted on a bearing 234C, which is provided on the inner wall of the housing 191, and a bearing 234D, which is supported by a holding member 244. Pulleys 231 and 232 are secured to the rotary shaft 229, and the, pulley 231 has a larger diameter than the pulley 203 which is secured to the output shaft 202 of the motor 201. A pulley 233 of the same diameter as the pulley 232 is secured to the rotary shaft 230.

A belt 235 is stretched between the pulley 203, which is secured to the output shaft 202 of the motor 201, and the pulley 231, which is secured to the rotary shaft 229. A belt 236 is stretched between the pulley 232, which is secured to the rotary shaft 229, and the pulley 233, which is secured to the rotary shaft 230.

The rotary shafts 229 and 230 rotate on rotation of the motor 201. The mirror box 222 moves back and forth on the rails 217, and the mirror box 221 moves back and forth on the rails 217 in connection with the mirror box 222.

In this embodiment, when the motor 201 rotates forward, the cam mechanism swings the scanning mirror 195, and the light beam scans in the main scanning direction. The mirror boxes 221, 222 move in the sub-scanning direction, and the light beam scans in the sub-scanning direction. On completion of the sub-scanning of the light beam and the printing of the image on the photo-sensitive sheet 216, the motor 201 starts reversing. Then, the engagement clutch 204 does not transmit the rotating force from the output shaft 202 of the motor 201 to the rotary shaft 205 of the cam mechanism. Thus, while the scanning mirror 195 remains stationary, only the mirror boxes 221, 222 move to the start sub-scanning position.

In this embodiment, the printer uses the LED light source, but the present invention may also be applied to a printer which uses another light source such as a laser.

As set forth hereinabove, according to the cam mechanism and the printer of the present invention, the cam mechanism used in the printer, etc. is constructed in such a way that the cam follower is arranged between the face cam and the press cam which faces the cam face of the face cam and has the same curve as that of the face cam, and the pressing means presses the press cam toward the face cam to pinch the cam follower. Thus, the contact friction between the cam face of the face cam and the cam follower and the load torque of the drive motor can be small, and it is possible to eliminate the unevenness of the torque resulting from the movement of the cam follower which moves up and down on the cam face. Thereby, the small drive motor can rotate at a high speed to thereby drive the cam mechanism so that the efficiency can be improved, and the cam follower can swing correctly.

According to the printer of the present invention, the mirror swinging mechanism in the main scanning is provided with the tilting mechanism, so that the main scanning lines can be parallel. Thus, the number of scanning lines can be doubled compared with a conventional method which performs a unidirectional scanning only. Moreover, the resolution can be high, the quantity of light can be sufficient, and there is no need to provide a fast-forwarding mechanism. The vibration and noise can be significantly reduced, and a print of high resolution can be easily made.

According to the printer of the present invention, if the motor rotates in a direction to return the photo-sensitive sheet or the means for making the light beam go onto the photo-sensitive sheet to the start printing position, the rotational driving force of the motor is not transmitted to the rotary shaft of the cam member to thereby prohibit the rotation of the cam member. Thus, it is possible to avoid a shock noise of the cam member and a contact friction, and the load torque of the motor can be reduced. If the motor rotates at a high speed in view of efficiency when the sub-scanning unit returns to the start printing position, the cam does not jump and the torque is small, so that the printing can be quietly performed without the shock noise made by the cam.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A cam mechanism comprising:

a face cam which is secured to a rotary shaft and rotates with said rotary shaft;

a press cam which is mounted on said rotary shaft movably in an axial direction of said rotary shaft and rotates with said rotary shaft, said press cam being provided with a cam face which faces a cam face of said face cam, a cam profile on the cam face of said press cam matching a cam profile on the cam face of said face cam;

pressing means for pressing said press cam toward said face cam; and a cam following section provided with a cam follower which is pinched between the cam faces of said face cam and said press cam, said cam following section being moved back and forth by rotation of said rotary shaft.

2. The cam mechanism as defined in claim 1, wherein said cam follower of said cam following section is provided with a first bearing which only abuts on the cam face of said face cam and a second bearing which only abuts on the cam face of said press cam.

3. A printer for printing an image on a photo-sensitive material wherein a motor drives a cam mechanism to oscillate a mirror for scanning a light beam in a main scanning direction, said motor moves the photo-sensitive material and the light beam relatively to one another in a sub-scanning direction, said cam mechanism comprises:

a face cam which is secured to a rotary shaft and rotates with said rotary shaft which is rotated by said motor;

a press cam which is mounted on said rotary shaft movably in an axial direction of said rotary shaft and rotates with said rotary shaft, said press cam being provided with a cam face which faces a cam face of said face cam, a cam profile on the cam face of said press cam matching a cam profile on the cam face of said face cam;

pressing means for pressing said press cam toward said face cam; and a cam following section provided with a cam follower which is pinched between the cam faces of said face cam and said press cam, said cam following section being moved back and forth by rotation of said rotary shaft to thereby oscillate said mirror.

4. The printer as defined in claim 3, wherein said cam follower of said cam following section is provided with a first bearing which only abuts on the cam face of said face cam and a second bearing which only abuts on the cam face of said press cam.

* * * * *